(12) United States Patent
Schmidtchen et al.

(10) Patent No.: US 12,422,916 B2
(45) Date of Patent: Sep. 23, 2025

(54) METHOD AND DEVICE FOR DYNAMIC SENSORY AND INPUT MODES BASED ON CONTEXTUAL STATE

(71) Applicant: Apple Inc., Cupertino, CA (US)

(72) Inventors: Bryce L. Schmidtchen, San Francisco, CA (US); Brian W. Temple, Santa Clara, CA (US); Devin W. Chalmers, Oakland, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/291,979

(22) PCT Filed: Jul. 13, 2022

(86) PCT No.: PCT/US2022/037010
§ 371 (c)(1),
(2) Date: Jan. 25, 2024

(87) PCT Pub. No.: WO2023/009318
PCT Pub. Date: Feb. 2, 2023

(65) Prior Publication Data
US 2024/0219998 A1    Jul. 4, 2024

Related U.S. Application Data

(60) Provisional application No. 63/325,148, filed on Mar. 30, 2022, provisional application No. 63/226,981, filed on Jul. 29, 2021.

(51) Int. Cl.
*G06F 3/01* (2006.01)
*G06T 19/20* (2011.01)

(52) U.S. Cl.
CPC ............. *G06F 3/011* (2013.01); *G06T 19/20* (2013.01); *G06T 2200/24* (2013.01); *G06T 2219/2016* (2013.01)

(58) Field of Classification Search
CPC .......... G06F 3/011; G06F 3/012; G06F 3/013; G06T 19/20; G06T 2200/24; G06T 2219/2016
See application file for complete search history.

(56) References Cited

U.S. PATENT DOCUMENTS

| 9,377,869 B2 | 6/2016 | Tait et al. | |
| 2008/0077865 A1* | 3/2008 | Hiles | H04M 1/72454 |
| | | | 715/708 |

(Continued)

FOREIGN PATENT DOCUMENTS

WO    2019232131 A1    12/2019

OTHER PUBLICATIONS

PCT International Search Report and Written Opinion dated Dec. 8, 2022, PCT International Application No. PCT/US2022/037010, pp. 1-21.

*Primary Examiner* — Mihir K Rayan
(74) *Attorney, Agent, or Firm* — Fernando & Partners, LLP

(57) ABSTRACT

In one implementation, a method for dynamically changing sensory and/or input modes associated with content based on a current contextual state. The method includes: while in a first contextual state, presenting extended reality (XR) content, via the display device, according to a first presentation N mode and enabling a first set of input modes to be directed to the XR content; detecting a change from the first contextual state to a second contextual state; and in response to detecting the change from the first contextual state to the second contextual state, presenting, via the display device, the XR content according to a second presentation mode different from the first presentation mode and enabling a second set of input modes to be directed to the XR content that are different from the first set of input modes.

25 Claims, 21 Drawing Sheets

(56) References Cited

U.S. PATENT DOCUMENTS

| | | | |
|---|---|---|---|
| 2013/0167094 A1* | 6/2013 | Blumenberg | G01C 21/3664 |
| | | | 715/863 |
| 2014/0181715 A1* | 6/2014 | Axelrod | H04M 1/72454 |
| | | | 715/771 |
| 2016/0266386 A1 | 9/2016 | Scott et al. | |
| 2018/0356636 A1 | 12/2018 | Kimura et al. | |
| 2019/0050062 A1* | 2/2019 | Chen | G06T 7/70 |
| 2020/0260213 A1 | 8/2020 | Mangiat et al. | |
| 2022/0129139 A1* | 4/2022 | Choi | G06F 1/163 |

\* cited by examiner

|  | WL | HL | BL |
|---|---|---|---|
| 6DOF World Tracking | > | X | X |
| Head Pose Tracking | > | X | > |
| Body Pose Tracking | X | X | > |

710

Candidate Presentation Mode Transitions

Transition 702: WL -> HL

Transition 704: WL -> BL

Transition 706: HL -> WL

Transition 708: HL -> BL

Transition 712: BL -> HL

Transition 714: BL -> WL

Figure 7

METHOD AND DEVICE FOR DYNAMIC SENSORY AND INPUT MODES BASED ON CONTEXTUAL STATE

TECHNICAL FIELD

The present disclosure generally relates to sensory and/or input modes associated with content and, in particular, to systems, devices, and methods for dynamically changing sensory and/or input modes associated with the content based on a current contextual state.

BACKGROUND

Content that is displayed in a first context may not be appropriate for a second context. As one example, a presentation mode and input modes for a timer widget while in a sitting state may not be appropriate while riding a bicycle or driving an automobile.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 illustrates various candidate presentation mode transitions in accordance with some implementations.

Figure 1:
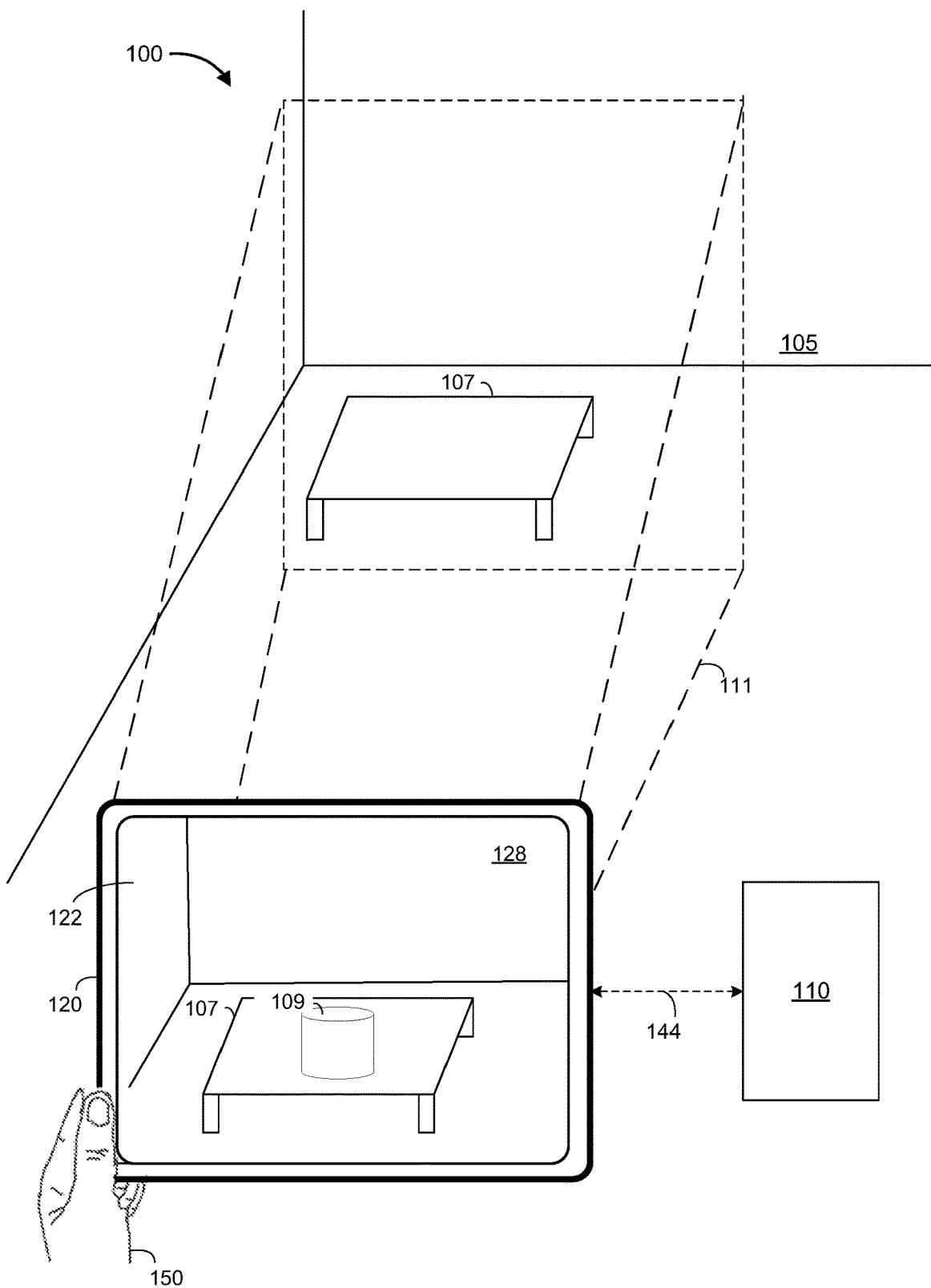
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for dynamically changing sensory and/or input modes associated with content based on a current contextual state. According to some implementations, the method is performed at a computing system including non-transitory memory and one or more processors, wherein the computing system is communicatively coupled to a display device and one or more input devices. The method includes: while in a first contextual state, presenting extended reality (XR) content, via the display device, according to a first presentation mode and enabling a first set of input modes to be directed to the XR content; detecting a change from the first contextual state to a second contextual state; and in response to detecting the change from the first contextual state to the second contextual state, presenting, via the display device, the XR content according to a second presentation mode different from the first presentation mode and enabling a second set of input modes to be directed to the XR content that are different from the first set of input modes.

Various implementations disclosed herein include devices, systems, and methods for improved presentation mode transitions. According to some implementations, the method is performed at a computing system including non-transitory memory and one or more processors, wherein the computing system is communicatively coupled to a display device and one or more input devices. The method includes: presenting, via the display device, a first user interface (UI) element in a first presentation mode, wherein the first UI element is associated with a first set of descriptors in the first presentation mode; while presenting the first UI element in the first presentation mode, detecting a trigger condition associated with transitioning the first UI element from the first presentation mode to a second presentation mode, wherein the first UI element is associated with a second set of descriptors different from the first set of descriptors in the second presentation mode; and in response to detecting the trigger condition: transitioning the first UI element from the first presentation mode to the second presentation mode by transforming the first set of descriptors to the second set of descriptors; and presenting, via the display device, the first UI element in the second presentation mode.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, µLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 or a representation thereof) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the displayed XR environment 128 will not include the XR cylinder 109. As another example, the XR cylinder 109 corresponds to body-locked content such that it remains at a positional and rotational offset from the body of the user 150. In some examples, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
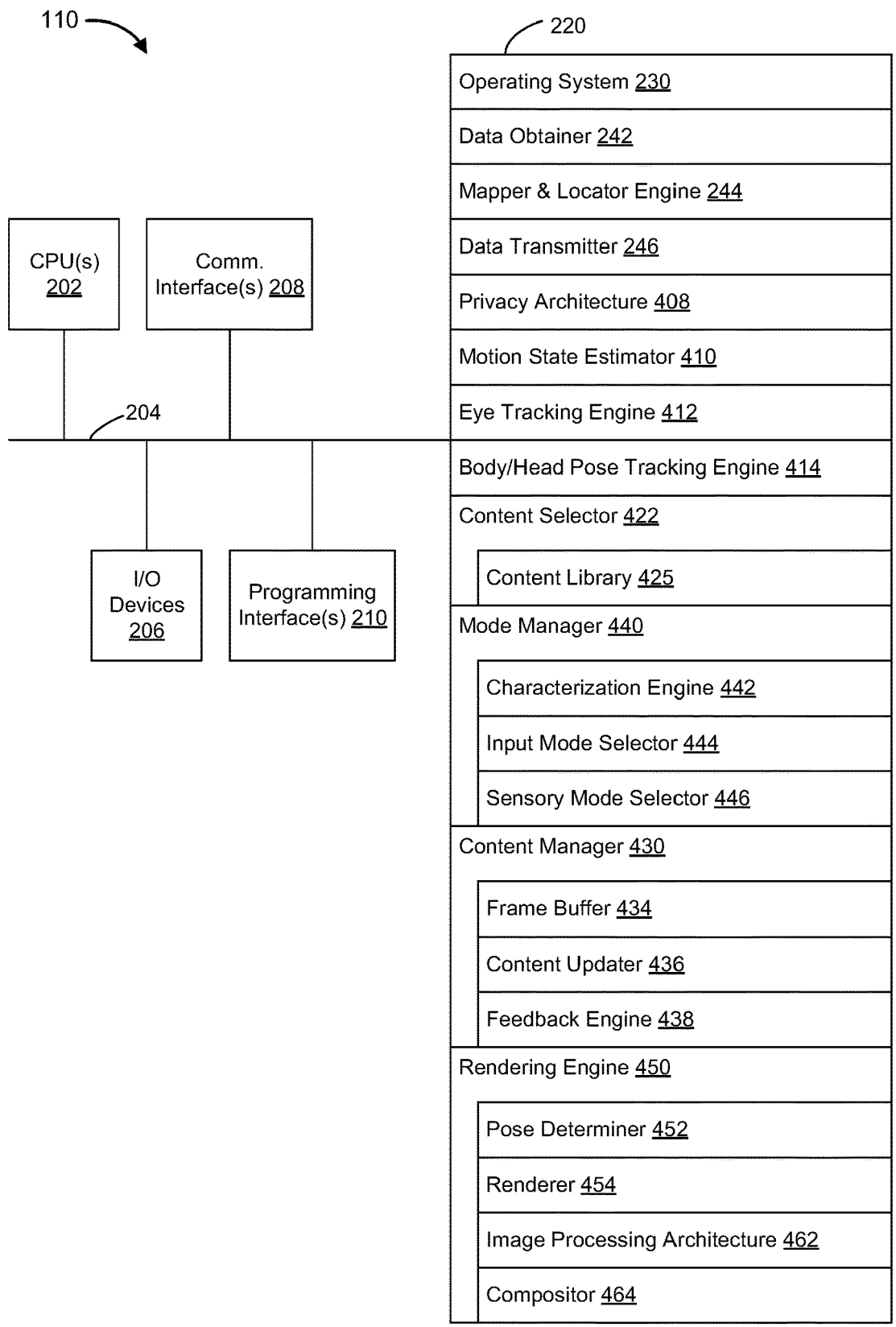
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 408 is configured to ingest data and filter user information and/or identifying information within the data based on one or more privacy filters. The privacy architecture 408 is described in more detail below with reference to FIG. 4A. To that end, in various implementations, the privacy architecture 408 includes instructions and/or logic therefor, and heuristics and metadata therefor.

In some implementations, a motion state estimator 410 is configured to obtain (e.g., receive, retrieve, or determine/generate) a motion state vector 411 associated with the electronic device 120 (and the user 150) (e.g., including a current motion state associated with the electronic device 120) based on input data and update the motion state vector 411 overtime. For example, as shown in FIG. 4B, the motion state vector 411 includes a motion state descriptor 472 for the electronic device 120 (e.g., stationary, in-motion, car, boat, bus, train, plane, or the like), translational movement values 474 associated with the electronic device 120 (e.g., a heading, a velocity value, an acceleration value, etc.), angular movement values 476 associated with the electronic device 120 (e.g., an angular velocity value, an angular acceleration value, and/or the like for each of the pitch, roll, and yaw dimensions), and/or the like. The motion state estimator 410 is described in more detail below with reference to FIG. 4A. To that end, in various implementations, the motion state estimator 410 includes instructions and/or logic therefor, and heuristics and metadata therefor.

In some implementations, an eye tracking engine 412 is configured to obtain (e.g., receive, retrieve, or determine/generate) an eye tracking vector 413 as shown in FIG. 4B (e.g., with a gaze direction) based on the input data and update the eye tracking vector 413 over time. For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking. The eye tracking engine 412 is described in more detail below with reference to FIG. 4A. To that end, in various implementations, the eye tracking engine 412 includes instructions and/or logic therefor, and heuristics and metadata therefor.

In some implementations, a body/head pose tracking engine 414 is configured to obtain (e.g., receive, retrieve, or determine/generate) a pose characterization vector 415 based on the input data and update the pose characterization vector 415 over time. For example, as shown in FIG. 4B, the pose characterization vector 415 includes a head pose descriptor 492A (e.g., upward, downward, neutral, etc.), translational values 492B for the head pose, rotational values 492C for the head pose, a body pose descriptor 494A (e.g., standing, sitting, prone, etc.), translational values 494B for body sections/extremities/limbs/joints, rotational values 494C for the body sections/extremities/limbs/joints, and/or the like. The body/head pose tracking engine 414 is described in more detail below with reference to FIG. 4A. To that end, in various implementations, the body/head pose tracking engine 414 includes instructions and/or logic therefor, and heuristics and metadata therefor. In some implementations, the motion state estimator 410, the eye tracking engine 412, and the body/head pose tracking engine 414 may be located on the electronic device 120 in addition to or in place of the controller 110.

In some implementations, a content selector 422 is configured to select XR content (sometimes also referred to herein as "graphical content" or "virtual content") from a content library 425 based on one or more user requests and/or inputs (e.g., a voice command, a selection from a user interface (UI) menu of XR content items or virtual agents (VAs), and/or the like). The content selector 422 is described in more detail below with reference to FIG. 4A. To that end, in various implementations, the content selector 422 includes instructions and/or logic therefor, and heuristics and metadata therefor.

In some implementations, the content library 425 includes a plurality of content items such as audio/visual (A/V) content, virtual agents (VAs), and/or XR content, objects, items, scenery, etc. As one example, the XR content includes 3D reconstructions of user captured videos, movies, TV episodes, and/or other XR content. In some implementations, the content library 425 is pre-populated or manually authored by the user 150. In some implementations, the content library 425 is located local relative to the controller 110. In some implementations, the content library 425 is located remote from the controller 110 (e.g., at a remote server, a cloud server, or the like).

In some implementations, a mode manager 440 is configured to select a set of input modes 445 and a presentation mode 447 based on a characterization vector 443. The mode manager 440 is described in more detail below with reference to FIG. 4A. To that end, in various implementations, the mode manager 440 includes instructions and/or logic therefor, and heuristics and metadata therefor. In some implementations, the mode manager 440 includes a characterization engine 442, an input mode selector 444, and a sensory mode selector 446.

Figure 4A:
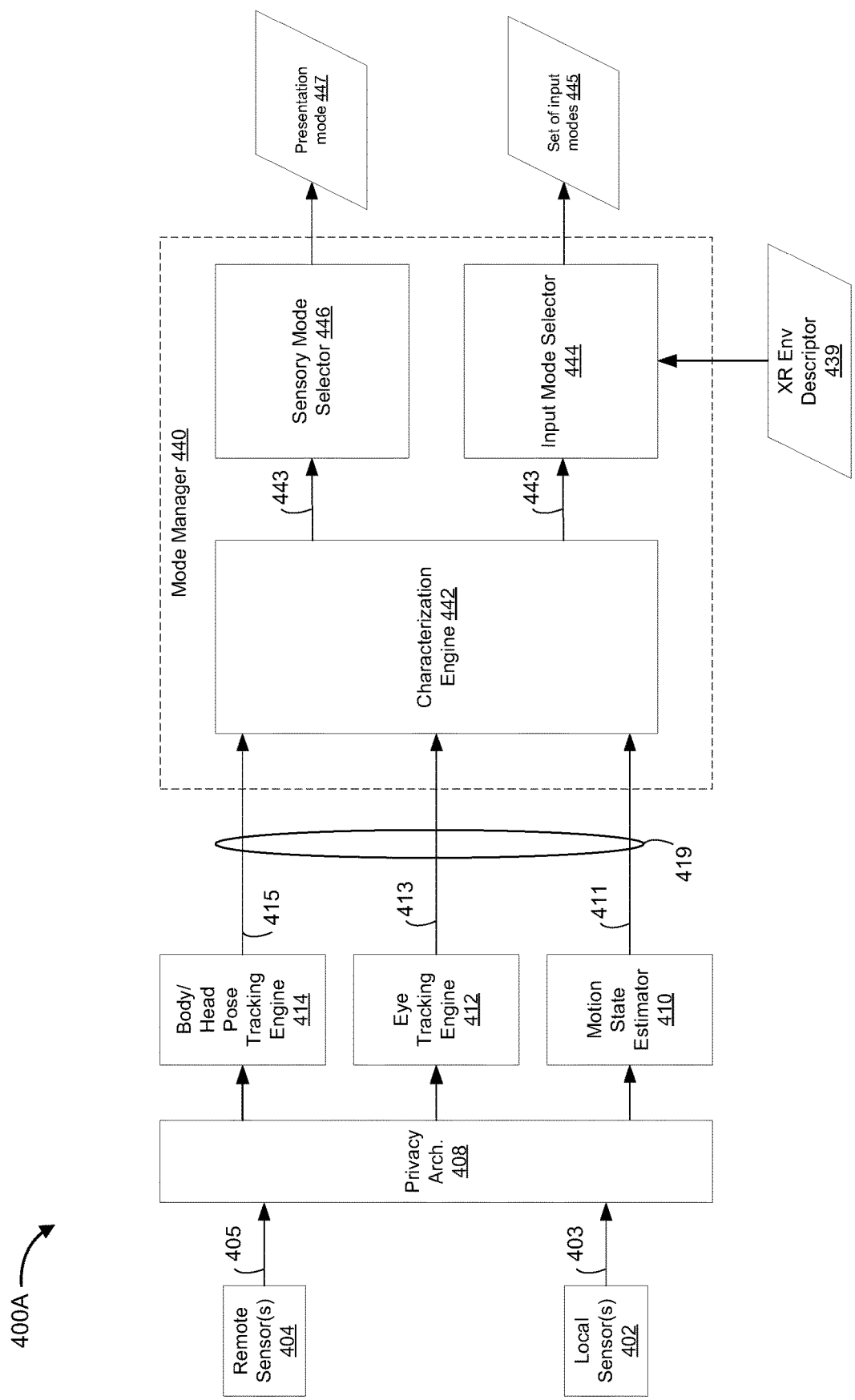
FIG. 4A is a block diagram of a first portion of an example content delivery architecture in accordance with some implementations.
Figure 4B:
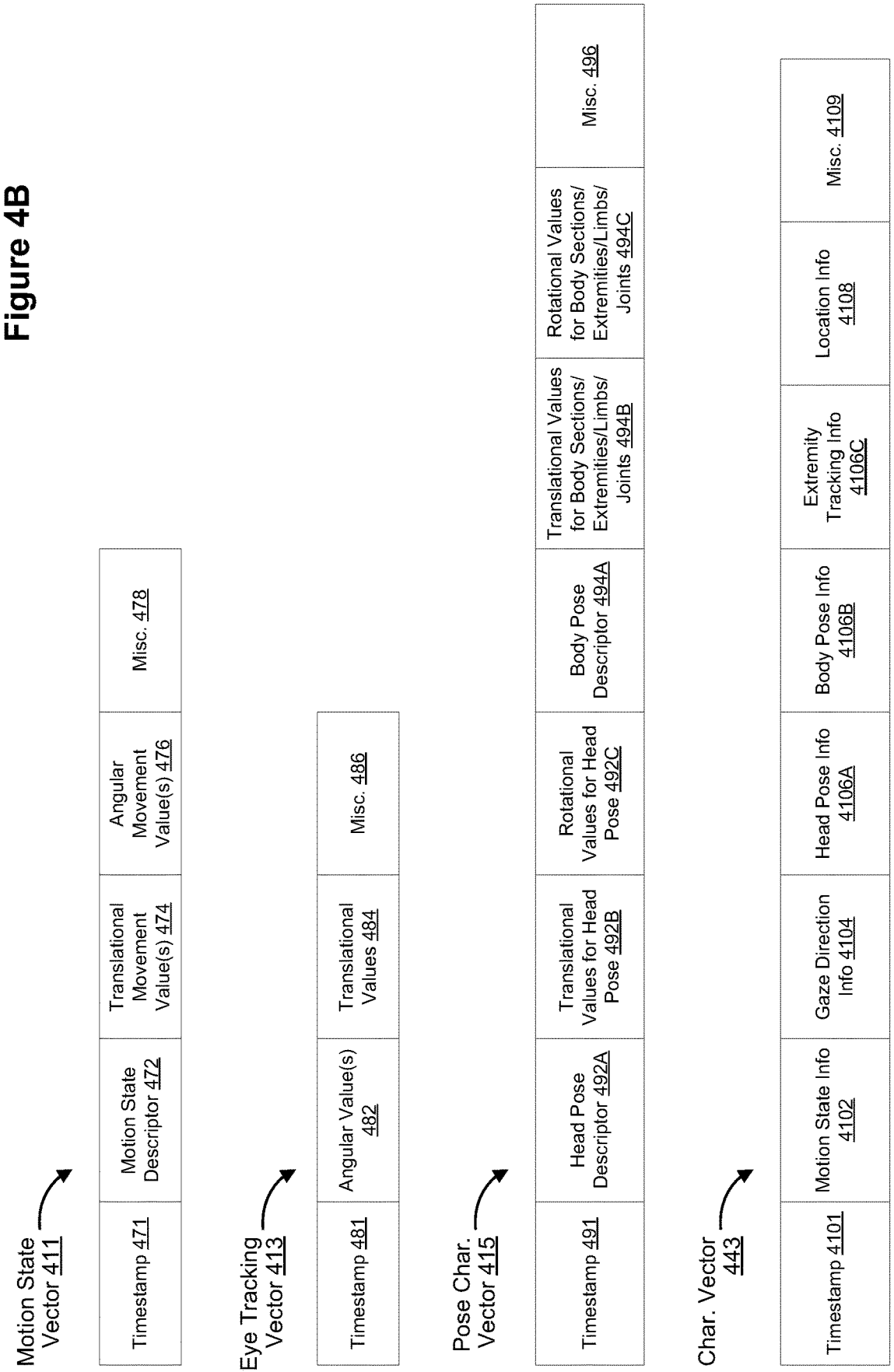
FIG. 4B illustrates example data structures in accordance with some implementations.

In some implementations, the characterization engine 442 is configured to determine/generate the characterization vector 443 based on at least one of the motion state vector 411, the eye tracking vector 413, and the pose characterization vector 415 as shown in FIG. 4A. In some implementations, the characterization engine 442 is also configured to update the pose characterization vector 443 over time. As shown in FIG. 4B, the characterization vector 443 includes motion state information 4102, gaze direction information 4104, head pose information 4106A, body pose information 4106B, extremity tracking information 4106C, location information 4108, and/or the like. The characterization engine 442 is described in more detail below with reference to FIG. 4A. To that end, in various implementations, the characterization engine 442 includes instructions and/or logic therefor, and heuristics and metadata therefor.

In some implementations, the input mode selector 444 is configured to select a current set of input modes for interacting with the XR environment 128 based on the characterization vector 443 and an XR environment descriptor 439 associated with the XR environment 128 shown in FIG. 4A (e.g., a scene description for the XR environment 128 and information associated with the XR content 427 therein). For example, the set of input modes may include at least one of hand/extremity tracking inputs, eye tracking inputs, touch inputs, voice commands, and/or the like. The input mode selector 444 is described in more detail below with reference to FIG. 4A. To that end, in various implementations, the input mode selector 444 includes instructions and/or logic therefor, and heuristics and metadata therefor.

In some implementations, the sensory mode selector 446 is configured to select a current presentation mode for XR content within the XR environment 128 based on the characterization vector 443. As one example, the presentation mode corresponds to one of a head/display-locked presentation mode, a body-locked presentation mode, a world/object-locked presentation mode, a device-locked presentation mode, and/or the like for the media content and/or XR content. As another example, the presentation mode corresponds to one of an appearance type or a content type. In some implementations, the sensory mode selector 446 is also configured to select a current haptic feedback mode, an audible feedback mode, and/or the like sensory mode for XR content within the XR environment 128 based on the characterization vector 443. In some implementations, the sensory mode selector 446 is also configured to select a current haptic feedback mode, an audible feedback mode, and/or the like sensory mode for XR content within the XR environment 128 based on user inputs, user preferences, user history, and/or the like. The sensory mode selector 446 is described in more detail below with reference to FIG. 4A. To that end, in various implementations, the sensory mode selector 446 includes instructions and/or logic therefor, and heuristics and metadata therefor.

In some implementations, a content manager 430 is configured to manage and update the layout, setup, structure, and/or the like for the XR environment 128 including one or more of VA(s), XR content, one or more user interface (UI) elements associated with the XR content, and/or the like. The content manager 430 is described in more detail below with reference to FIG. 4C. To that end, in various implementations, the content manager 430 includes instructions and/or logic therefor, and heuristics and metadata therefor. In some implementations, the content manager 430 includes a frame buffer 434, a content updater 436, and a feedback engine 438. In some implementations, the frame buffer 434 includes XR content, a rendered image frame, and/or the like for one or more past instances and/or frames.

In some implementations, the content updater 436 is configured to modify the XR environment 128 over time based on translational or rotational movement of the electronic device 120 or physical objects within the physical environment 105, user inputs (e.g., a change in context, hand/extremity tracking inputs, eye tracking inputs, touch inputs, voice commands, modification/manipulation inputs with the physical object, and/or the like), and/or the like. To that end, in various implementations, the content updater 436 includes instructions and/or logic therefor, and heuristics and metadata therefor.

In some implementations, the feedback engine 438 is configured to generate sensory feedback (e.g., visual feedback such as text or lighting changes, audio feedback, haptic feedback, etc.) associated with the XR environment 128. To that end, in various implementations, the feedback engine 438 includes instructions and/or logic therefor, and heuristics and metadata therefor.

In some implementations, a rendering engine 450 is configured to render an XR environment 128 (sometimes also referred to herein as a "graphical environment" or "virtual environment") or image frame associated therewith as well as the VA(s), XR content, one or more UI elements associated with the XR content, and/or the like. To that end, in various implementations, the rendering engine 450 includes instructions and/or logic therefor, and heuristics and metadata therefor. In some implementations, the rendering engine 450 includes a pose determiner 452, a renderer 454, an optional image processing architecture 462, and an optional compositor 464. One of ordinary skill in the art will appreciate that the optional image processing architecture 462 and the optional compositor 464 may be present for video pass-through configurations but may be removed for fully VR or optical see-through configurations.

In some implementations, the pose determiner 452 is configured to determine a current camera pose of the electronic device 120 and/or the user 150 relative to the A/V content and/or XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A.

To that end, in various implementations, the renderer 454 includes instructions and/or logic therefor, and heuristics and metadata therefor.

In some implementations, the image processing architecture 462 is configured to obtain (e.g., receive, retrieve, or capture) an image stream including one or more images of the physical environment 105 from the current camera pose of the electronic device 120 and/or the user 150. In some implementations, the image processing architecture 462 is also configured to perform one or more image processing operations on the image stream such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment 128 for display. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the privacy architecture 408, the motion state estimator 410, the eye tracking engine 412, the body/head pose tracking engine 414, the content selector 422, the content manager 430, the operation mode manager 440, and the rendering engine 450 are shown as residing on a single device (e.g., the controller 110), it should be understood that in other implementations, any combination of the data obtainer 242, the mapper and locator engine 244, the data transmitter 246, the privacy architecture 408, the motion state estimator 410, the eye tracking engine 412, the body/head pose tracking engine 414, the content selector 422, the content manager 430, the operation mode manager 440, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
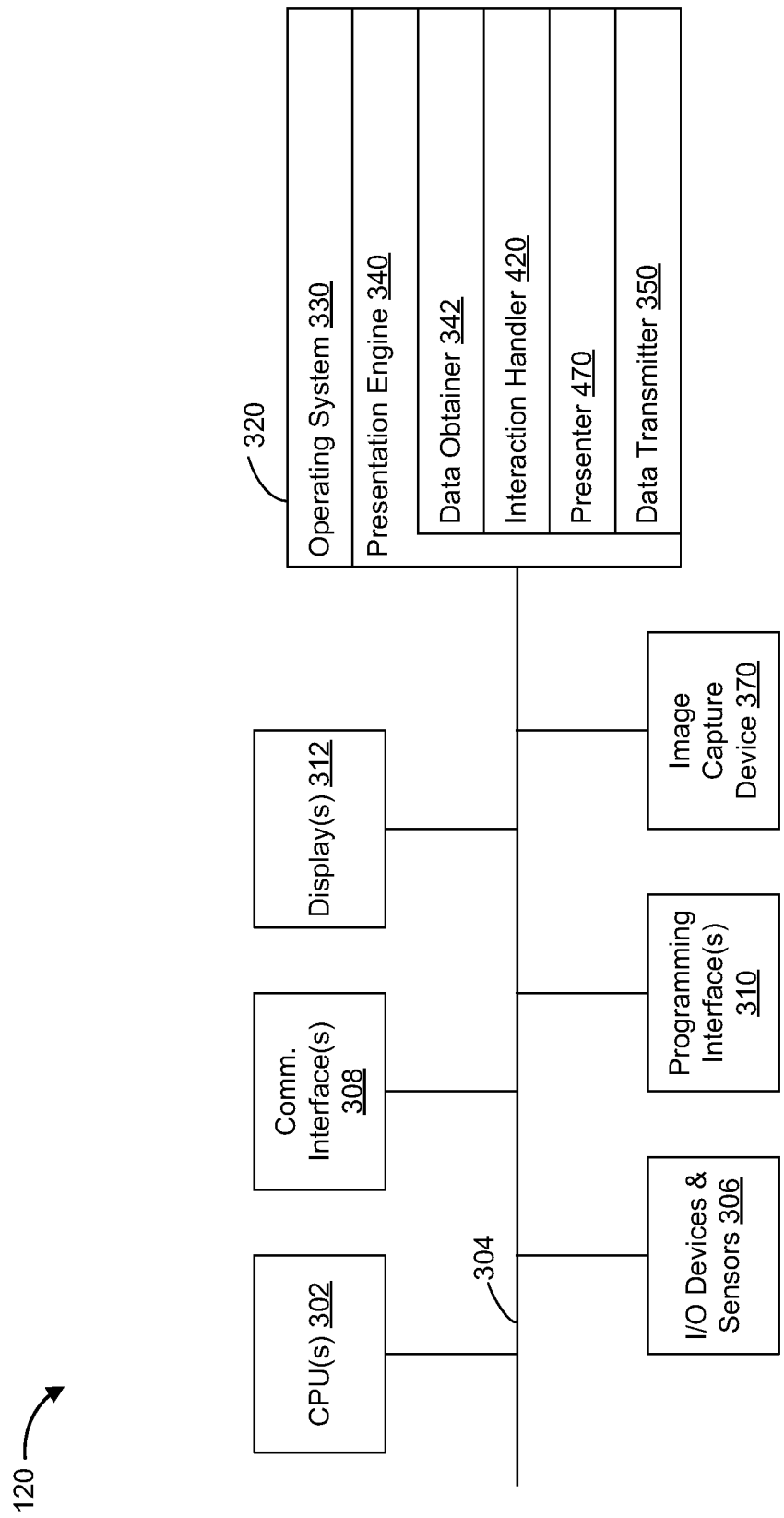
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 470, an interaction handler 420, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 420 is configured to detect user interactions with the presented A/V content and/or XR content (e.g., gestural inputs detected via hand/extremity tracking, eye gaze inputs detected via eye tracking, voice commands, etc.). To that end, in various implementations, the interaction handler 420 includes instructions and/or logic therefor, and heuristics and metadata therefor.

In some implementations, the presenter 470 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 470 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 420, the presenter 470, and the data transmitter 350 are shown as residing on a single device (e.g., the electronic device 120), it should be understood that in other implementations, any combination of the data obtainer 342, the interaction handler 420, the presenter 470, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4A is a block diagram of a first portion 400A of an example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits the content delivery architecture 400A/400B or portions thereof from obtaining and/or transmitting the user information. To this end, the privacy architecture 408 receives user preferences and/or selections from the user 150 in response to prompting the user 150 for the same. In some implementations, the privacy architecture 408 prevents the content delivery architecture 400A/400B from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the motion state estimator 410 obtains the local sensor data 403 and the remote sensor data 405 after it has been subjected to the privacy architecture 408. In some implementations, the motion state estimator 410 obtains (e.g., receives, retrieves, or determines/generates) a motion state vector 411 based on the input data and updates the motion state vector 411 over time.

FIG. 4B shows an example data structure for the motion state vector 411 in accordance with some implementations. As shown in FIG. 4B, the motion state vector 411 may correspond to an N-tuple characterization vector or characterization tensor that includes a timestamp 471 (e.g., the most recent time the motion state vector 411 was updated), a motion state descriptor 472 for the electronic device 120 (e.g., stationary, in-motion, car, boat, bus, train, plane, or the like), translational movement values 474 associated with the electronic device 120 (e.g., a heading, a velocity value, an acceleration value, etc.), angular movement values 476 associated with the electronic device 120 (e.g., an angular velocity value, an angular acceleration value, and/or the like for each of the pitch, roll, and yaw dimensions), and/or miscellaneous information 478. One of ordinary skill in the art will appreciate that the data structure for the motion state vector 411 in FIG. 4B is merely an example that may include different information portions in various other implementations and be structured in myriad ways in various other implementations.

According to some implementations, the eye tracking engine 412 obtains the local sensor data 403 and the remote sensor data 405 after it has been subjected to the privacy architecture 408. In some implementations, the eye tracking engine 412 obtains (e.g., receives, retrieves, or determines/generates) an eye tracking vector 413 based on the input data and updates the eye tracking vector 413 over time.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., roll, pitch, and yaw values), one or more translational values 484 for the current gaze direction (e.g., x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the body/head pose tracking engine 414 obtains the local sensor data 403 and the remote sensor data 405 after it has been subjected to the privacy architecture 408. In some implementations, the body/head pose tracking engine 414 obtains (e.g., receives, retrieves, or determines/generates) a pose characterization vector 415 based on the input data and updates the pose characterization vector 415 over time.

FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4B is merely an example that may include different information portions in various other implementations and be structured in myriad ways in various other implementations. According to some implementations, the motion state vector 411, the eye tracking vector 413 and the pose characterization vector 415 are collectively referred to as an input vector 419.

According to some implementations, the characterization engine 442 obtains the motion state vector 411, the eye tracking vector 413 and the pose characterization vector 415. In some implementations, the characterization engine 442 obtains (e.g., receives, retrieves, or determines/generates) the characterization vector 443 based on the motion state vector 411, the eye tracking vector 413, and the pose characterization vector 415.

FIG. 4B shows an example data structure for the characterization vector 443 in accordance with some implementations. As shown in FIG. 4B, the characterization vector 443 may correspond to an N-tuple characterization vector or characterization tensor that includes a timestamp 4101 (e.g., the most recent time the characterization vector 443 was updated), motion state information 4102 (e.g., the motion state descriptor 472), gaze direction information 4104 (e.g., a function of the one or more angular values 482 and the one or more translational values 484 within the eye tracking vector 413), head pose information 4106A (e.g., the head pose descriptor 492A), body pose information 4106B (e.g., a function of the body pose descriptor 494A within the pose characterization vector 415), extremity tracking information 4106C (e.g., a function of the body pose descriptor 494A within the pose characterization vector 415 that is associated with extremities of the user 150 that are being tracked by the controller 110, the electronic device 120, and/or a combination thereof), location information 4108 (e.g., a household location such as a kitchen or living room, a vehicular location such as an automobile, plane, etc., and/or the like), and/or miscellaneous information 4109.

According to some implementations, the input mode selector 444 selects a current set of input modes 445 for interacting with the XR environment 128 based on the characterization vector 443 and an XR environment descriptor 439 associated with the XR environment 128 (e.g., a scene description for the XR environment 128 and information associated with the XR content 427 therein). For example, the set of input modes 445 may include at least one of hand/extremity tracking inputs, eye tracking inputs, touch inputs, voice commands, and/or the like.

According to some implementations, the sensory mode selector 446 selects a current presentation mode 447 for XR content within the XR environment 128 based on the characterization vector 443. For example, the presentation mode 447 corresponds to one of a head-locked presentation mode, a body-locked presentation mode, a world/object-locked presentation mode, a device-locked presentation mode, and/ or the like for the media content and/or the XR content. As another example, the presentation mode 447 corresponds to one of an appearance type or a content type. In some implementations, the sensory mode selector 446 may also select a haptic feedback mode, an audible feedback mode, and/or the like sensory mode for XR content within the XR environment 128 based on the characterization vector 443.

Figure 4C:
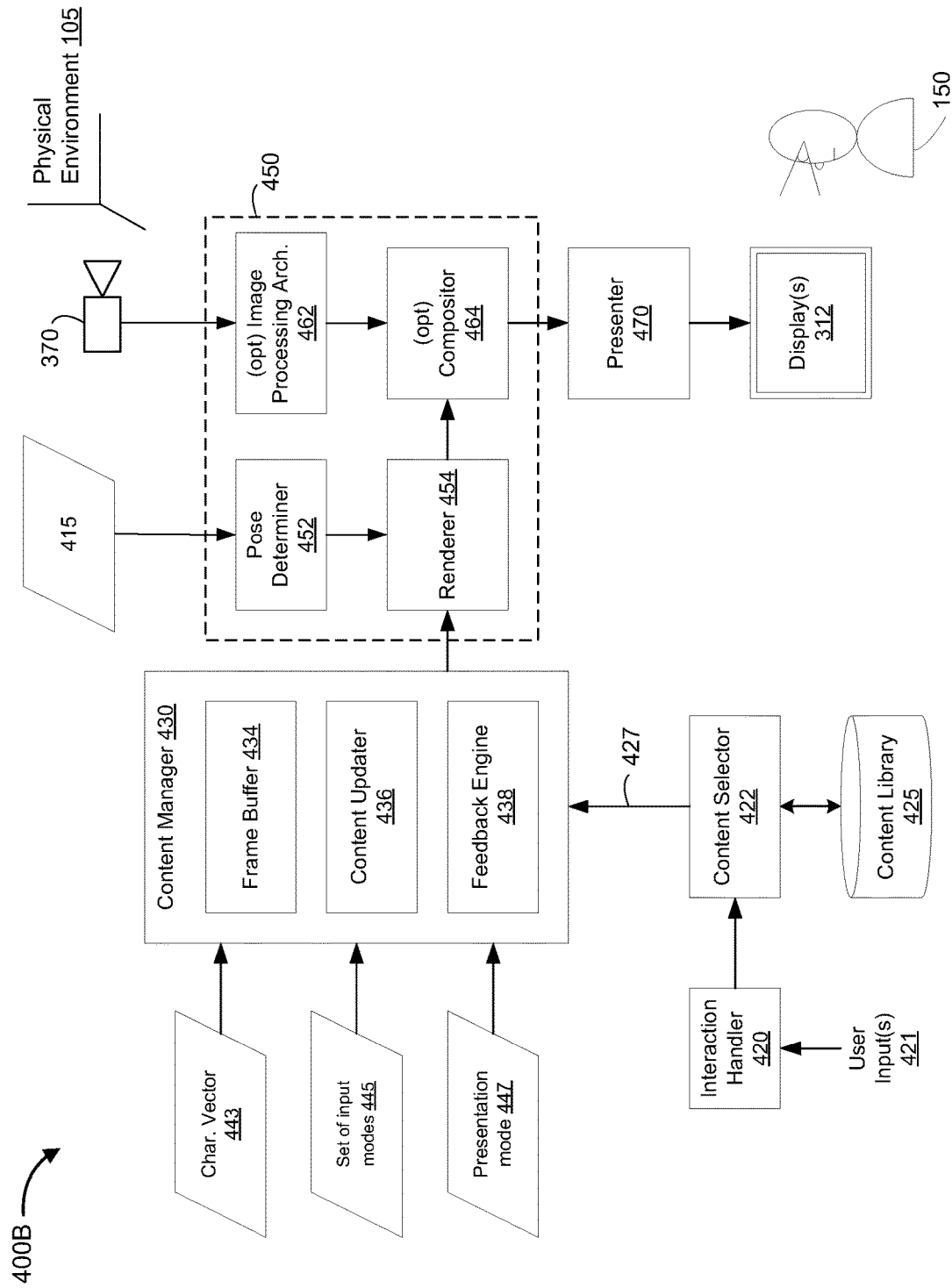
FIG. 4C is a block diagram of a second portion of the example content delivery architecture in accordance with some implementations.

FIG. 4C is a block diagram of a second portion 400B of the example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof. FIG. 4C is similar to and adapted from FIG. 4A. Therefore, similar reference numbers are used in FIGS. 4A and 4C. As such, only the differences between FIGS. 4A and 4C will be described below for the sake of brevity.

According to some implementations, the interaction handler 420 obtains (e.g., receives, retrieves, or detects) one or more user inputs 421 provided by the user 150 that are associated with selecting A/V content, one or more VAs, and/or XR content for presentation. For example, the one or more user inputs 421 correspond to a gestural input selecting XR content from a UI menu detected via hand/extremity tracking, an eye gaze input selecting XR content from the UI menu detected via eye tracking, a voice command selecting XR content from the UI menu detected via a microphone, and/or the like. In some implementations, the content selector 422 selects XR content 427 from the content library 425 based on one or more user inputs 421 (e.g., a voice command, a selection from a menu of XR content items, and/or the like).

In various implementations, the content manager 430 manages and updates the layout, setup, structure, and/or the like for the XR environment 128, including one or more of VAs, XR content, one or more UI elements associated with the XR content, and/or the like, based on the characterization vector 443, the selected set of input modes 445, the selected presentation mode 447, (optionally) the user inputs 421, and/or the like. To that end, the content manager 430 includes the frame buffer 434, the content updater 436, and the feedback engine 438.

In some implementations, the frame buffer 434 includes XR content, a rendered image frame, and/or the like for one or more past instances and/or frames. In some implementations, the content updater 436 modifies the XR environment 128 over time based on the characterization vector 443, the selected set of input modes 445, the selected presentation mode 447, the user inputs 421 associated with modifying and/or manipulating the XR content or VA(s), translational or rotational movement of objects within the physical environment 105, translational or rotational movement of the electronic device 120 (or the user 150), and/or the like. In some implementations, the feedback engine 438 generates sensory feedback (e.g., visual feedback such as text or lighting changes, audio feedback, haptic feedback, etc.) associated with the XR environment 128.

According to some implementations, the pose determiner 452 determines a current camera pose of the electronic device 120 and/or the user 150 relative to the XR environment 128 and/or the physical environment 105 based at least in part on the pose characterization vector 415. In some implementations, the renderer 454 renders the VA(s), the XR content 427, one or more UI elements associated with the XR content, and/or the like according to the current camera pose relative thereto.

According to some implementations, the optional image processing architecture 462 obtains an image stream from an image capture device 370 including one or more images of the physical environment 105 from the current camera pose of the electronic device 120 and/or the user 150. In some implementations, the image processing architecture 462 also performs one or more image processing operations on the image stream such as warping, color correction, gamma correction, sharpening, noise reduction, white balance, and/ or the like. In some implementations, the optional compositor 464 composites the rendered XR content with the processed image stream of the physical environment 105 from the image processing architecture 462 to produce rendered image frames of the XR environment 128. In various implementations, the presenter 470 presents the rendered image frames of the XR environment 128 to the user 150 via the one or more displays 312. One of ordinary skill in the art will appreciate that the optional image processing architecture 462 and the optional compositor 464 may not be applicable for fully virtual environments (or optical see-through scenarios).

FIGS. 5A-5L illustrate a sequence of instances 510-5120 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 510-5120 are rendered and presented by a computing system such as the controller 110 shown in FIGS. 1 and 2; the electronic device 120 shown in FIGS. 1 and 3; and/or a suitable combination thereof.

As shown in FIGS. 5A-5L, the content delivery scenario includes a physical environment 105 and an XR environment 128 displayed on the display 122 of the electronic device 120 (e.g., associated with the user 150). The electronic device 120 presents the XR environment 128 to the user 150 while the user 150 is physically present within the physical environment 105 that includes a door 115, which is currently within the FOV 111 of an exterior-facing image sensor of the electronic device 120. As such, in some implementations, the user 150 holds the electronic device 120 in his/her left hand similar to the operating environment 100 in FIG. 1.

In other words, in some implementations, the electronic device 120 is configured to present XR content and to enable optical see-through or video pass-through of at least a portion of the physical environment 105 (e.g., a portion of a kitchen in FIGS. 5A-5C that is within the FOV 111 of the electronic device 120) on the display 122. For example, the electronic device 120 corresponds to a mobile phone, tablet, laptop, near-eye system, wearable computing device, or the like.

Figure 5A:
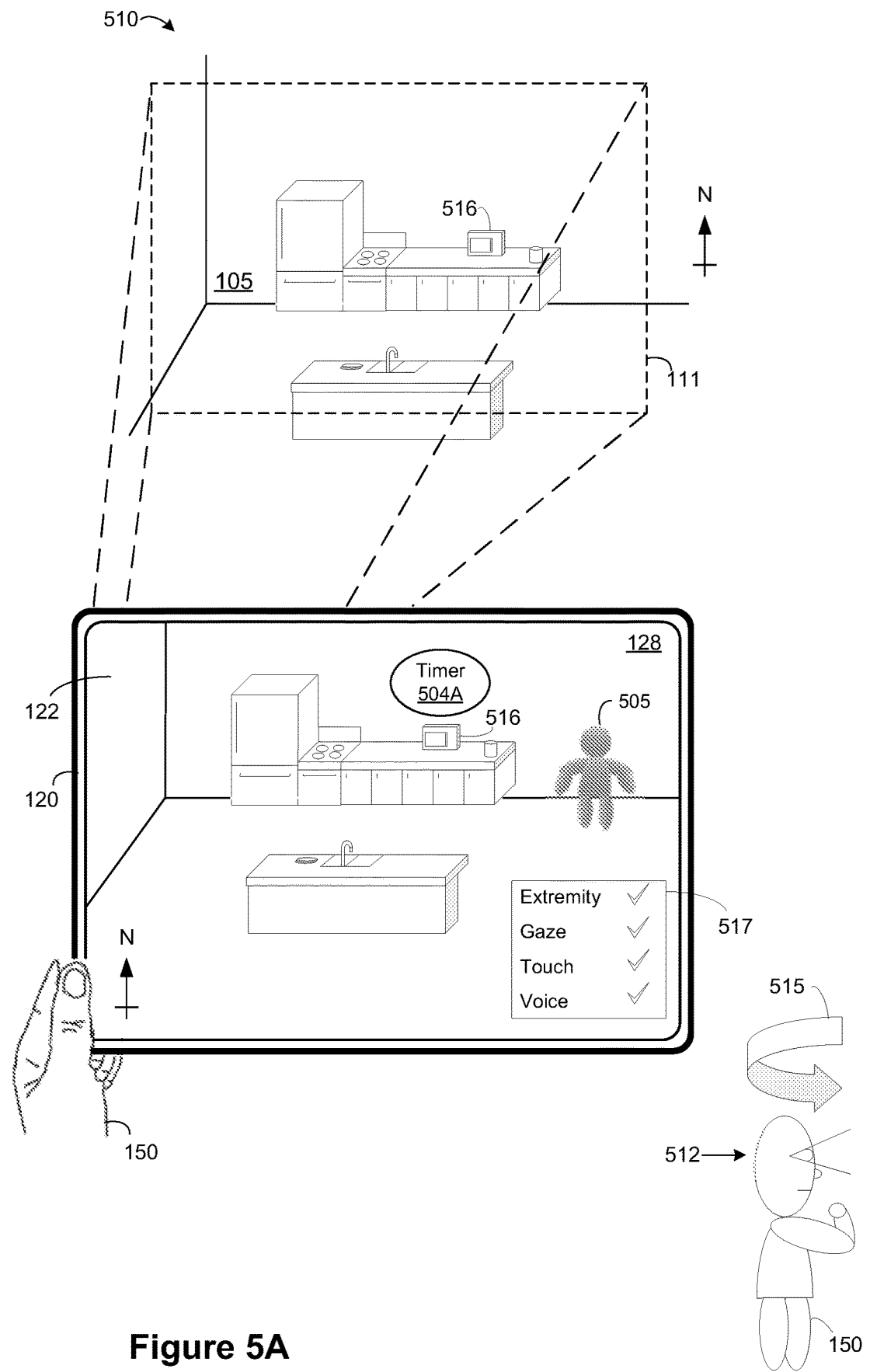
FIGS. 5A-5L illustrate a sequence of instances for a content delivery scenario in accordance with some implementations.

As shown in FIG. 5A, during the instance 510 (e.g., associated with time $T_1$) of the content delivery scenario, the electronic device 120 presents an XR environment 128 including a virtual agent (VA) 505 and video pass-through of the physical environment 105 (e.g., the kitchen in FIGS. 5A-5C) from a northward facing direction. In FIG. 5A, the XR environment 128 also includes a timer widget 504A associated with a first appearance and a first presentation mode and a text box 517 associated with a current set of input modes for interacting with the XR environment 128. For example, the timer widget 504A corresponds to text, an image, an icon, a badge, video content, volumetric/3D XR content, and/or the like. For example, the first appearance associated with the timer widget 504A corresponds to an oval shape, a first size, a first color, a first brightness, and/or the like (e.g., a first visualization of a countdown timer). One of ordinary skill in the art will appreciate that the timer widget 504A is merely an example visualization that may be modified, replaced, or omitted in various other implementations. In some implementations, the first presentation mode for the timer widget 504A corresponds to a world/object-locked presentation mode whereby the timer widget 504A is anchored to a physical object (e.g., a microwave 516) within the physical environment 105.

As shown in FIG. 5A, the text box 517 associated with the current set of input modes for interacting with the XR environment 128 indicates that the following input modes are currently enabled: extremity tracking, eye tracking, touch, and voice. One of ordinary skill in the art will appreciate that the text box 517 is merely an example visualization that may be modified, replaced, or omitted in various other implementations. As one example, the text box 517 may be replaced with audio output from the electronic device 120 or the like.

Figure 5B:
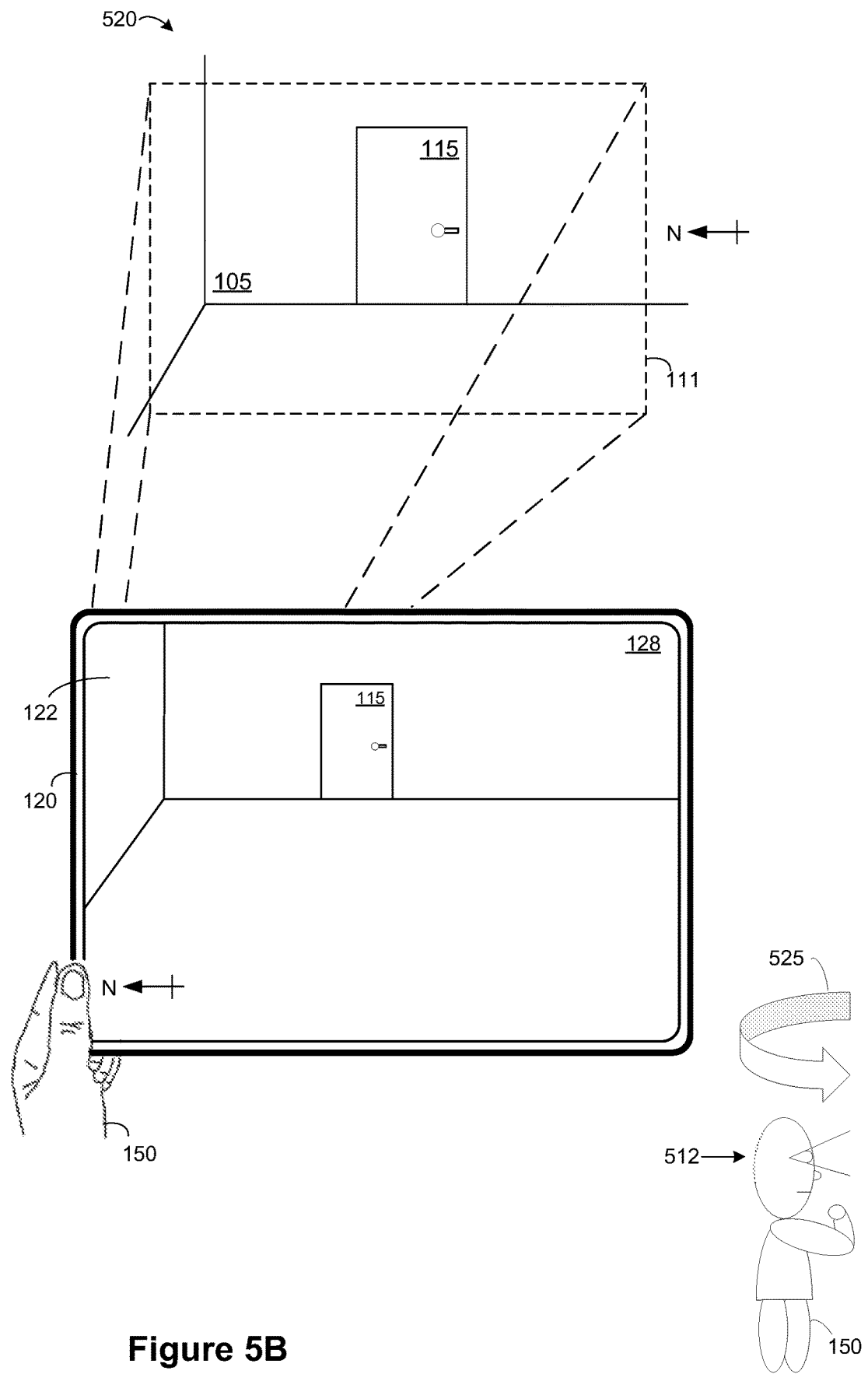
Figure 5C:
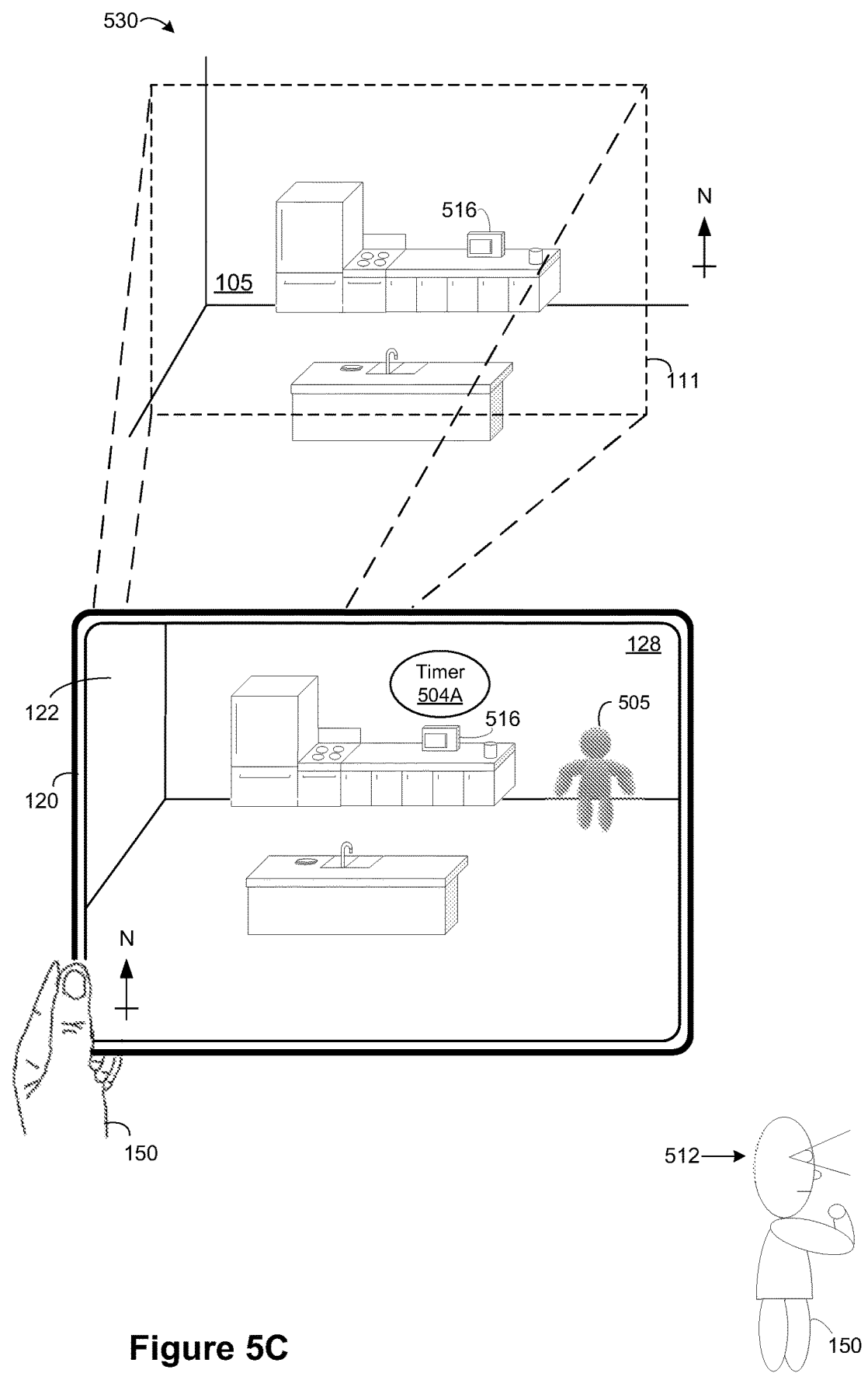

In FIG. 5A, the FOV 111 of the exterior-facing image sensors of the electronic device 120 is currently headed in the northward facing direction. For example, the directional arrow is optionally displayed within the XR environment 128. According to some implementations, FIGS. 5A-5C illustrate a current body pose 512 of the user 150. In FIGS. 5A-5C, the current body pose 512 corresponds to a standing pose. As shown in FIG. 5A, during the instance 510 (e.g., associated with time $T_1$) of the content delivery scenario, the electronic device 120 detects a change in the camera pose of the electronic device 120 (or the head pose of the user 150) that corresponds to a 900 clockwise rotational movement 515.

As shown in FIG. 5B, during the instance 520 (e.g., associated with time $T_2$) of the content delivery scenario, the electronic device 120 presents the XR environment 128 including video pass-through of the physical environment 105, including a door 115, from an eastward facing direction in response to detecting the 90° clockwise rotational movement 515 in FIG. 5A. In FIG. 5B, the XR environment 128 lacks the VA 505 and the timer widget 504A. As shown in FIG. 5B, during the instance 520 (e.g., associated with time $T_2$) of the content delivery scenario, the electronic device 120 detects a change in the camera pose of the electronic device 120 (or the head pose of the user 150) that corresponds to a 90° counterclockwise rotational movement 525.

As shown in FIG. 5C, during the instance 530 (e.g., associated with time $T_3$) of the content delivery scenario, the electronic device 120 presents the XR environment 128 including the VA 505 and video pass-through of the physical environment 105 (e.g., the kitchen in FIGS. 5A-5C) from the northward facing direction in response to detecting the 90° counterclockwise rotational movement 525 in FIG. 5B. As shown in FIG. 5C, the XR environment 128 also includes the timer widget 504A associated with the first appearance and the first presentation mode (e.g., the world/object-locked presentation mode), where the timer widget 504A is adjacent to the microwave 516 similar to FIG. 5A. In this example, the timer widget 504A is associated with the world/object-locked presentation mode to aid the user 150 as he/she cooks dinner. More specifically, the timer widget 504A may be locked to the stovetop to aid in properly timing the cooking of a food item or a dish on the stovetop. However, if the user 150 leaves the kitchen, the electronic device 120 may change the timer widget 504A to a head/display-locked presentation mode so the user 150 may keep track of the timer widget 504A while outside of the kitchen. In some implementations, the set of input modes for interacting with the XR environment 128 during the instances 520 and 530 may be the same as those available during the instance 510. While not shown, the display 122 may optionally present the text box 517 during the instances 520 and 530 to indicate the available set of input modes.

Figure 5D:
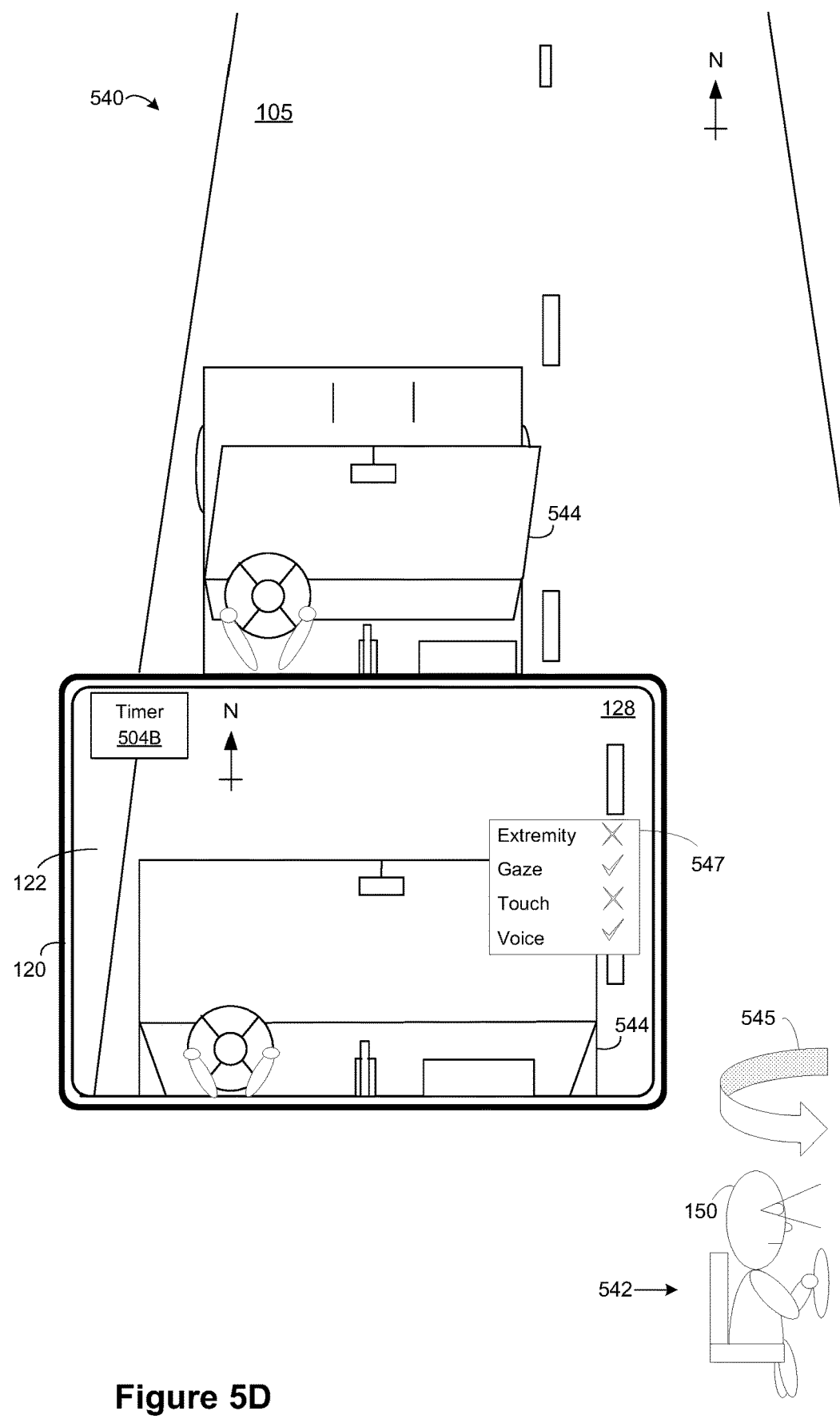

As shown in FIG. 5D, during the instance 540 (e.g., associated with time $T_4$) of the content delivery scenario, the electronic device 120 presents the XR environment 128 including video pass-through of the physical environment 105 (e.g., a view from a driver's seat of an automobile 544 in FIGS. 5D-5F) from a northward facing direction. In FIG. 5D, the XR environment 128 also includes a timer widget 504B associated with a second appearance and a second presentation mode and a text box 547 associated with a current set of input modes for interacting with the XR environment 128. For example, the timer widget 504B corresponds to text, an image, an icon, a badge, video content, volumetric/3D XR content, and/or the like. For example, the second appearance associated with the timer widget 504B corresponds to a rectangular shape, a second size, a second color, a second brightness, and/or the like (e.g., a second visualization of a countdown timer). One of ordinary skill in the art will appreciate that the timer widget 504B is merely an example visualization that may be modified, replaced, or omitted in various other implementations. In some implementations, the second presentation mode for the timer widget 504B corresponds to a head/display-locked presentation mode whereby the timer widget 504B is anchored to a predefined position on the display 122.

As shown in FIG. 5D, the text box 547 associated with the current set of input modes for interacting with the XR environment 128 indicates that the following input modes are currently enabled: eye tracking and voice. One of ordinary skill in the art will appreciate that the text box 547 is merely an example visualization that may be modified, replaced, or omitted in various other implementations. As one example, the text box 547 may be replaced with audio output from the electronic device 120 or the like.

Figure 5E:
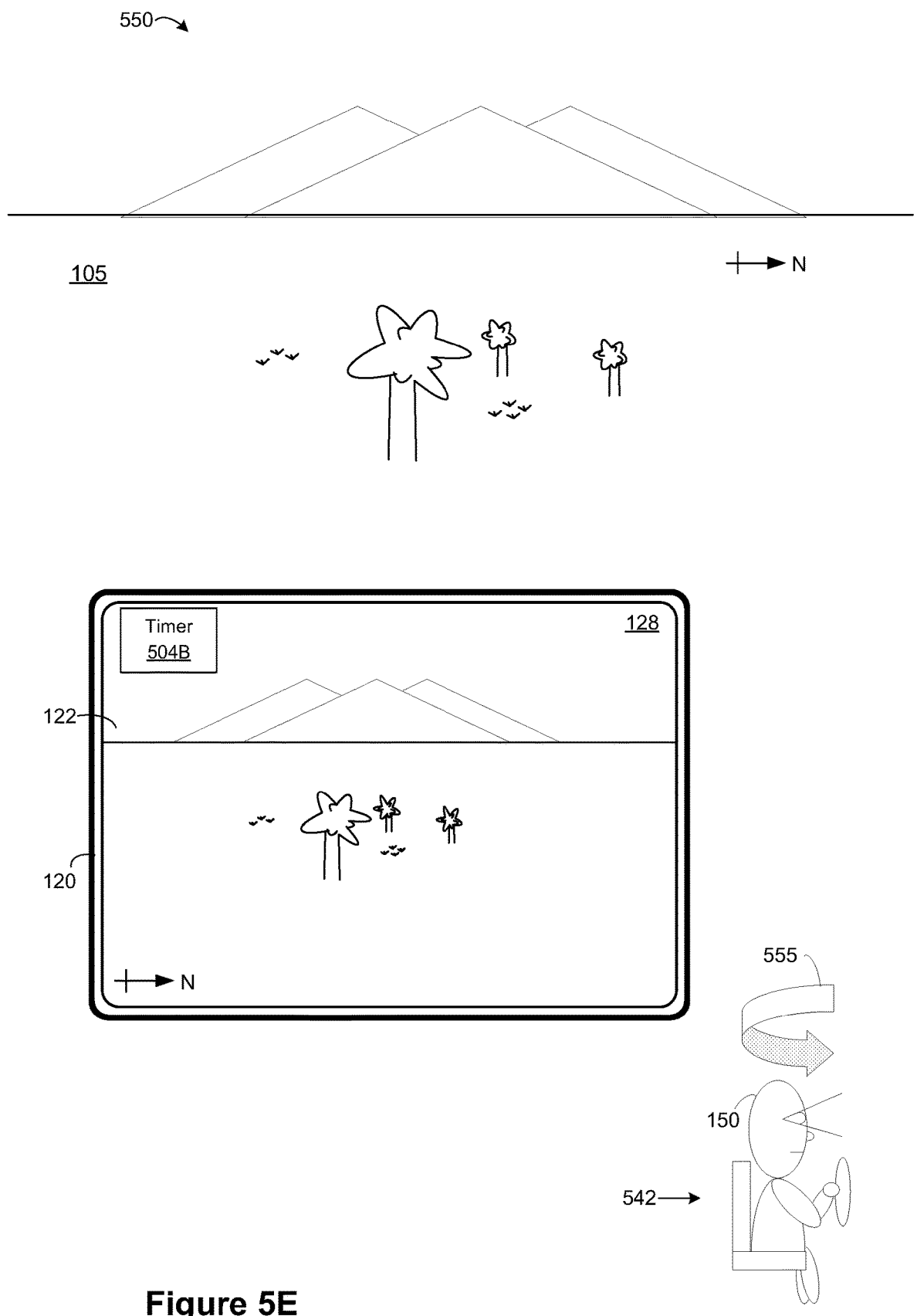
Figure 5F:
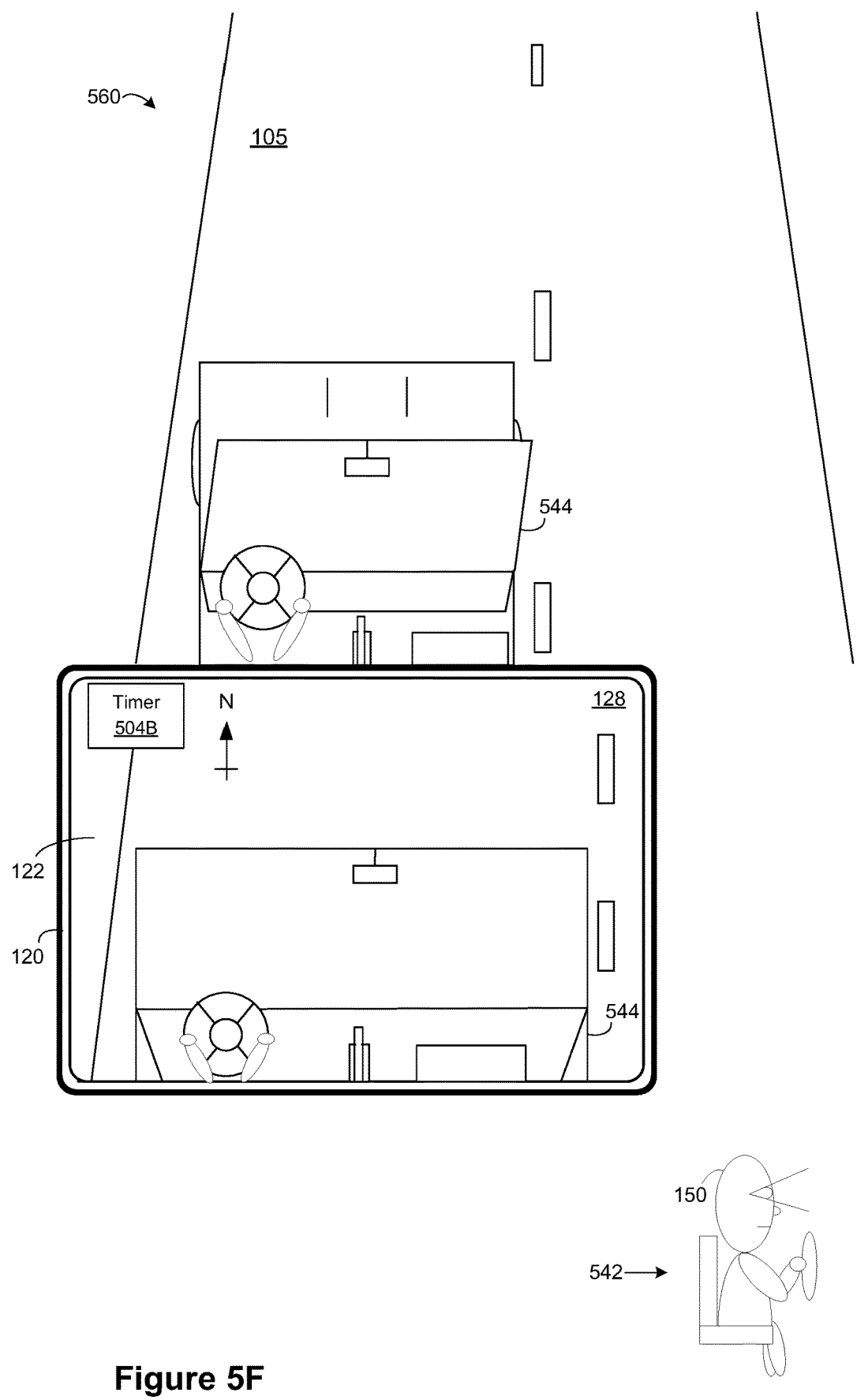

In FIG. 5D, the FOV of the exterior-facing image sensors of the electronic device 120 is currently headed in the northward facing direction. For example, the directional arrow is optionally displayed within the XR environment 128. According to some implementations, FIGS. 5D-5F illustrate a current body pose 542 of the user 150. In FIGS. 5D-5F, the current body pose 542 corresponds to a sitting pose while operating a moving automobile 544. As shown in FIG. 5D, during the instance 540 (e.g., associated with time $T_4$) of the content delivery scenario, the electronic device 120 detects a change in the camera pose of the electronic device 120 (or the head pose of the user 150) that corresponds to a 900 counterclockwise rotational movement 545.

As shown in FIG. 5E, during the instance 550 (e.g., associated with time $T_5$) of the content delivery scenario, the electronic device 120 presents the XR environment 128 including video pass-through of the physical environment 105, including mountains and trees, from a westward facing direction (e.g., a view from a driver-side window of the automobile 544) in response to detecting the 90° counterclockwise rotational movement 545 in FIG. 5D. In FIG. 5E, the XR environment 128 includes the widget timer 504B associated with the second appearance and the second presentation mode (e.g., the head/display-locked presentation mode) in the same location on the display 122 as in FIG. 5D. As shown in FIG. 5E, during the instance 550 (e.g., associated with time $T_5$) of the content delivery scenario, the electronic device 120 detects a change in the camera pose of the electronic device 120 (or the head pose of the user 150) that corresponds to a 90° clockwise rotational movement 555.

As shown in FIG. 5F, during the instance 560 (e.g., associated with time $T_6$) of the content delivery scenario, the electronic device 120 presents the XR environment 128 including video pass-through of the physical environment 105 from the northward facing direction in response to detecting the 900 clockwise rotational movement 555 in FIG. 5E. In FIG. 5F, the XR environment 128 includes the widget timer 504B associated with the second appearance and the second presentation mode (e.g., the head/display-locked presentation mode) in the same location as in FIGS. 5D and 5E. In this example, the timer widget 504B is associated with the head/display-locked presentation mode so as not to the obstruct the user 150's view as he/she is driving the automobile 544. In some implementations, the set of input modes for interacting with the XR environment 128 during the instances 550 and 560 may be the same as those available during the instance 540. While not shown, the display 122 may optionally present the text box 547 during the instances 550 and 560 to indicate the available set of input modes.

Figure 5G:
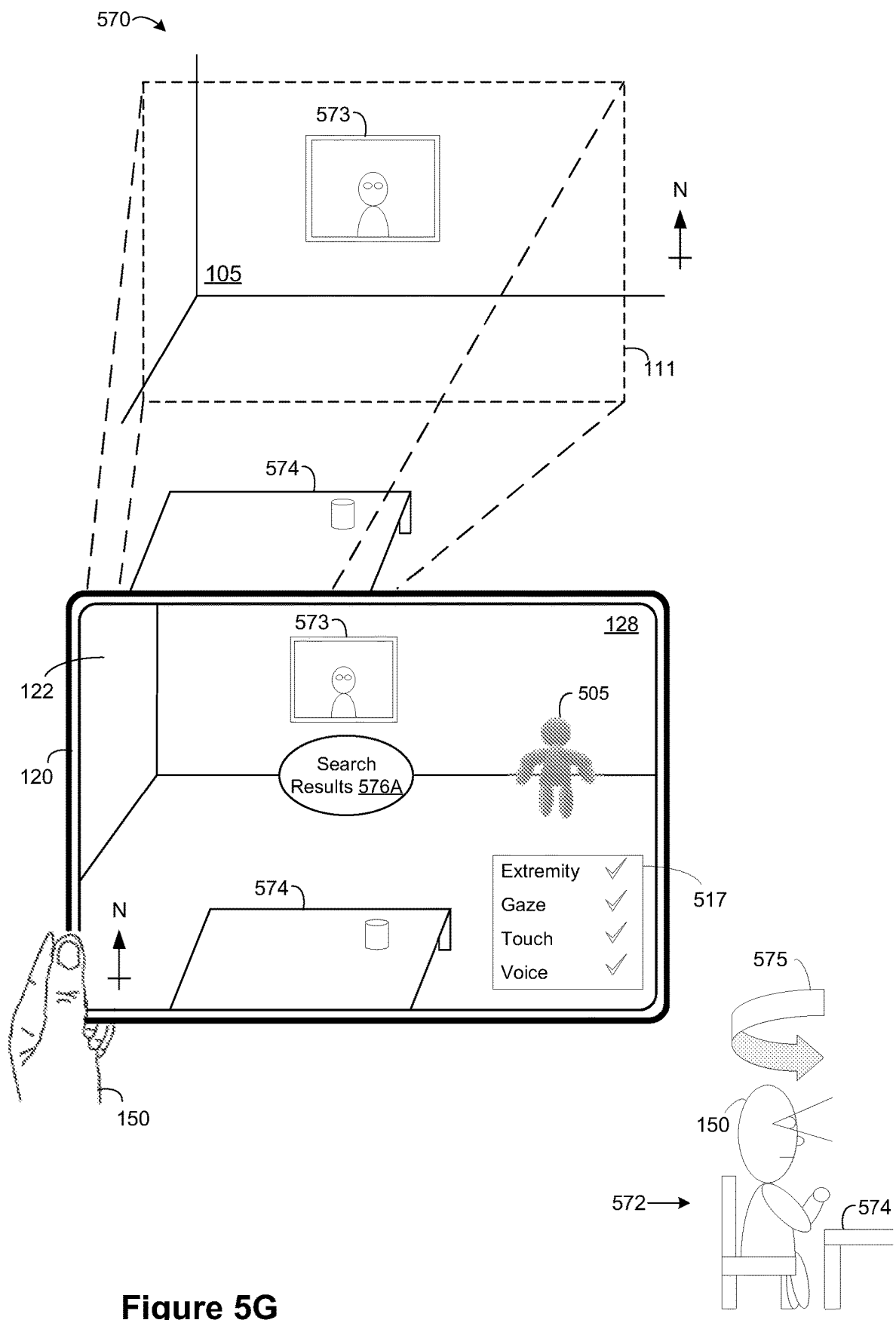

As shown in FIG. 5G, during the instance 570 (e.g., associated with time $T_7$) of the content delivery scenario, the electronic device 120 presents the XR environment 128 including the VA 505 and video pass-through of the physical environment 105 (e.g., including a painting 573 and a table 574) from a northward facing direction. In FIG. 5G, the XR environment 128 also includes search results 576A adjacent to the painting 573 that are associated with a first appearance and a first presentation mode and the text box 517 associated with the current set of input modes for interacting with the XR environment 128. For example, the search results 576A corresponds to text, an image, an icon, a badge, video content, volumetric/3D XR content, and/or the like that results from a search command associated with the painting 573 (e.g., "Who painted this?" or "What is the title of this painting?" or "When was this painting originally created?") provided by the user 150. For example, the first appearance associated with the search results 576A corresponds to an oval shape, a first size, a first color, a first brightness, and/or the like. One of ordinary skill in the art will appreciate that the search results 576A are merely an example visualization that may be modified, replaced, or omitted in various other implementations. In some implementations, the first presentation mode for the search results 576A corresponds to a world/object-locked presentation mode whereby the search results 576A are anchored to a physical object (e.g., the painting 573) within the physical environment 105.

As shown in FIG. 5G, the text box 517 associated with the current set of input modes for interacting with the XR environment 128 indicates that the following input modes are currently enabled: extremity tracking, eye tracking, touch, and voice. One of ordinary skill in the art will appreciate that the text box 517 is merely an example visualization that may be modified, replaced, or omitted in various other implementations. As one example, the text box 517 may be replaced with audio output from the electronic device 120 or the like.

Figure 5H:
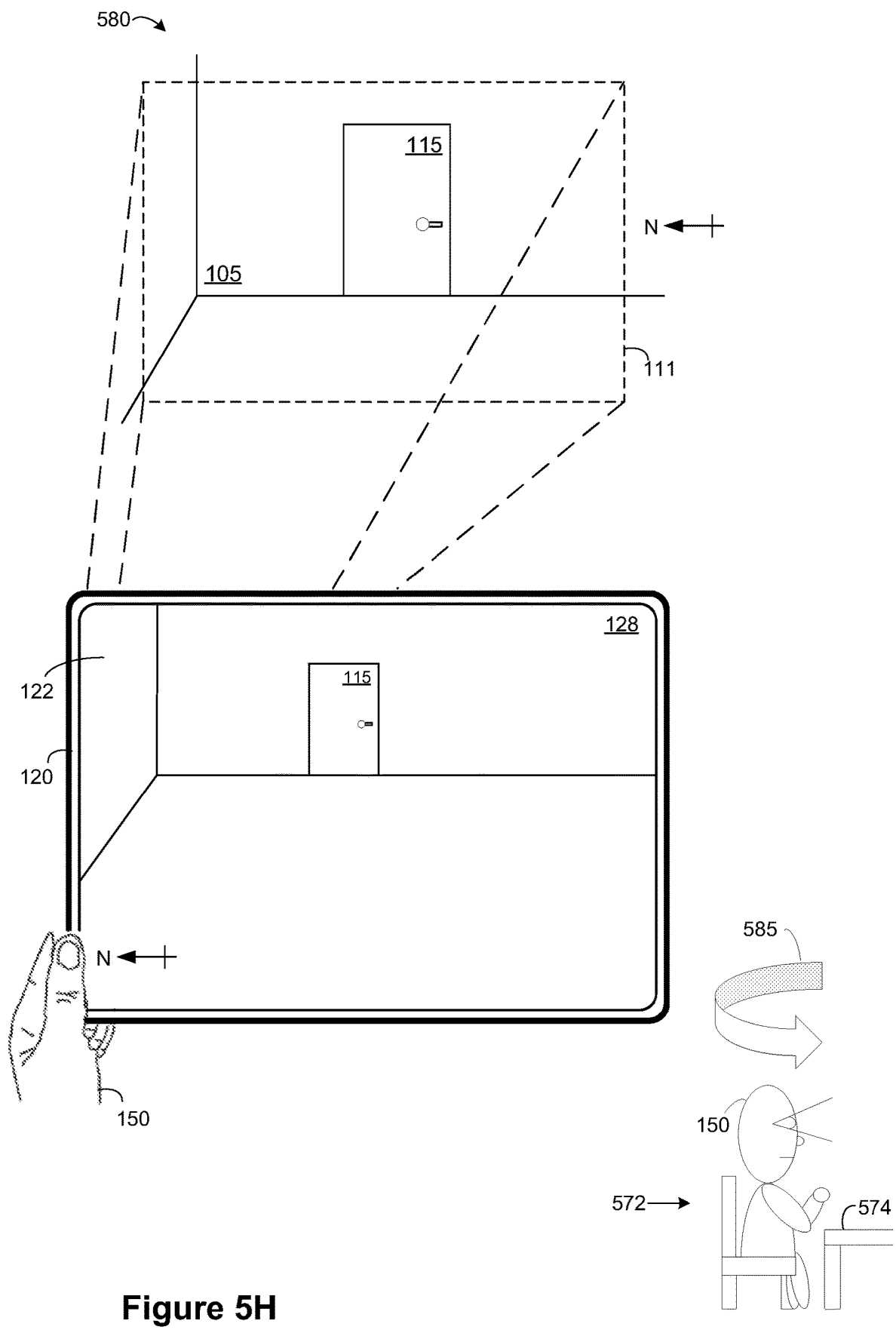
Figure 5I:
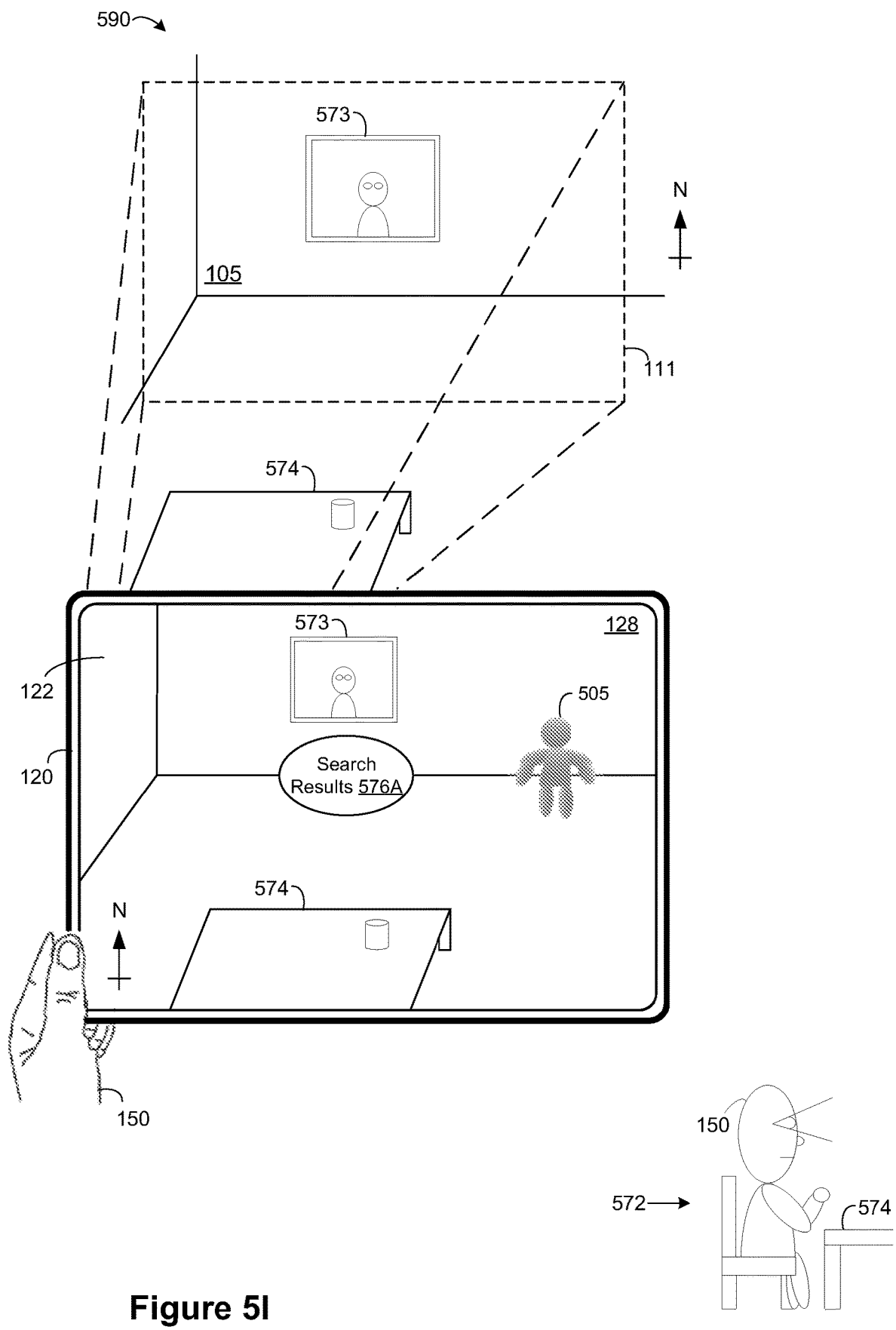

In FIG. 5G, the FOV 111 of the exterior-facing image sensors of the electronic device 120 is currently headed in the northward facing direction. For example, the directional arrow is optionally displayed within the XR environment 128. According to some implementations, FIGS. 5G-5I illustrate a current body pose 572 of the user 150. In FIGS. 5G-5I, the current body pose 572 corresponds to a sitting pose at the table 574. As shown in FIG. 5G, during the instance 570 (e.g., associated with time $T_7$) of the content delivery scenario, the electronic device 120 detects a change in the camera pose of the electronic device 120 (or the head pose of the user 150) that corresponds to a 900 clockwise rotational movement 575.

As shown in FIG. 5H, during the instance 580 (e.g., associated with time $T_8$) of the content delivery scenario, the electronic device 120 presents the XR environment 128 including video pass-through of the physical environment 105, including a door 115, from an eastward facing direction in response to detecting the 90° clockwise rotational movement 575 in FIG. 5G. In FIG. 5H, the XR environment 128 lacks the VA 505 and the search results 576A. As shown in FIG. 5H, during the instance 580 (e.g., associated with time $T_5$) of the content delivery scenario, the electronic device 120 detects a change in the camera pose of the electronic device 120 (or the head pose of the user 150) that corresponds to a 90° counterclockwise rotational movement 585.

As shown in FIG. 5I, during the instance 590 (e.g., associated with time $T_9$) of the content delivery scenario, the electronic device 120 presents the XR environment 128 including the VA 505 and video pass-through of the physical environment 105 from the northward facing direction in response to detecting the 90° counterclockwise rotational movement 585 in FIG. 5H. As shown in FIG. 5I, the XR environment 128 also includes the search results 576A associated with the first appearance and the first presentation mode (e.g., the world/object-locked presentation mode), where the search results 576A are adjacent to the painting 573 similar to FIG. 5G. In this example, the search results 576A are associated with the world/object-locked presentation mode to educate the user 150 as he/she views the painting 573. However, if the user 150 leaves the room with the painting 573, the electronic device 120 may change the search results 576A to a head/display-locked presentation mode so the user 150 may peruse the search results 576A at a time of their choosing. In some implementations, the set of input modes for interacting with the XR environment 128 during the instances 580 and 590 may be the same as those available during the instance 570. While not shown, the display 122 may optionally present the text box 517 during the instances 580 and 590 to indicate the available set of input modes.

Figure 5J:
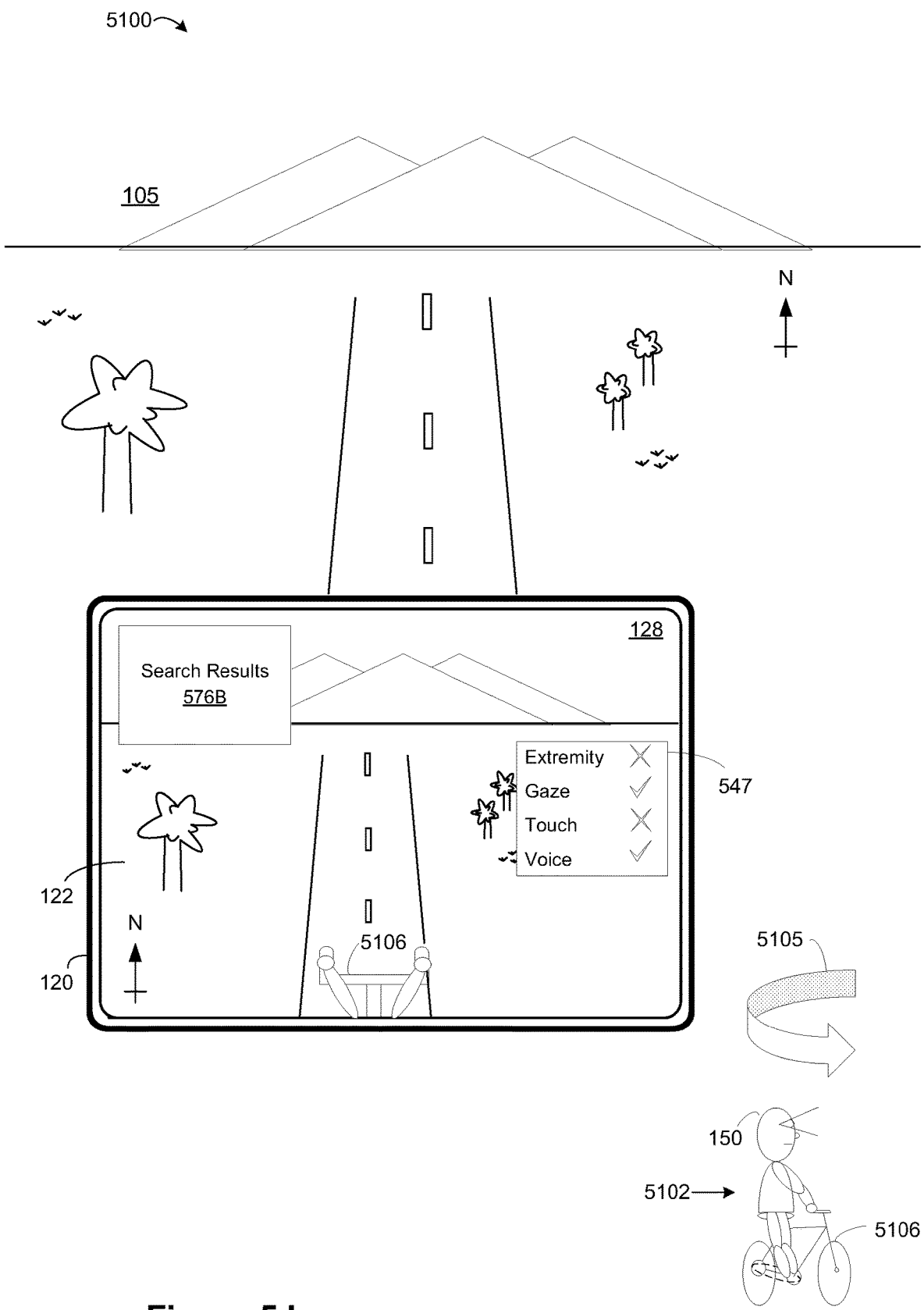

As shown in FIG. 5J, during the instance 5100 (e.g., associated with time $T_{10}$) of the content delivery scenario, the electronic device 120 presents the XR environment 128 including video pass-through of the physical environment 105 (e.g., a view from a bicycle in FIGS. 5J-5L) from a northward facing direction. In FIG. 5J, the XR environment 128 also includes search results 576B associated with a second appearance and a second presentation mode and the text box 547 associated with a current set of input modes for interacting with the XR environment 128. For example, the search results 576B corresponds to text, an image, an icon, a badge, video content, volumetric/3D XR content, and/or the like that results from a search command (e.g., "How long have I been biking?" or "What is on my calendar for tomorrow?" or "What time is sunset?") provided by the user 150. For example, the second appearance associated with the search results 576B corresponds to a rectangular shape, a second size, a second color, a second brightness, and/or the like. One of ordinary skill in the art will appreciate that the search results 576B are merely an example visualization that may be modified, replaced, or omitted in various other implementations. In some implementations, the second presentation mode for the search results 576B corresponds to a head/display-locked presentation mode whereby the search results 576B are anchored to a predefined position on the display 122.

As shown in FIG. 5J, the text box 547 associated with the current set of input modes for interacting with the XR environment 128 indicates that the following input modes are currently enabled: eye tracking and voice. One of ordinary skill in the art will appreciate that the text box 547 is merely an example visualization that may be modified, replaced, or omitted in various other implementations. As one example, the text box 547 may be replaced with audio output from the electronic device 120 or the like.

Figure 5K:
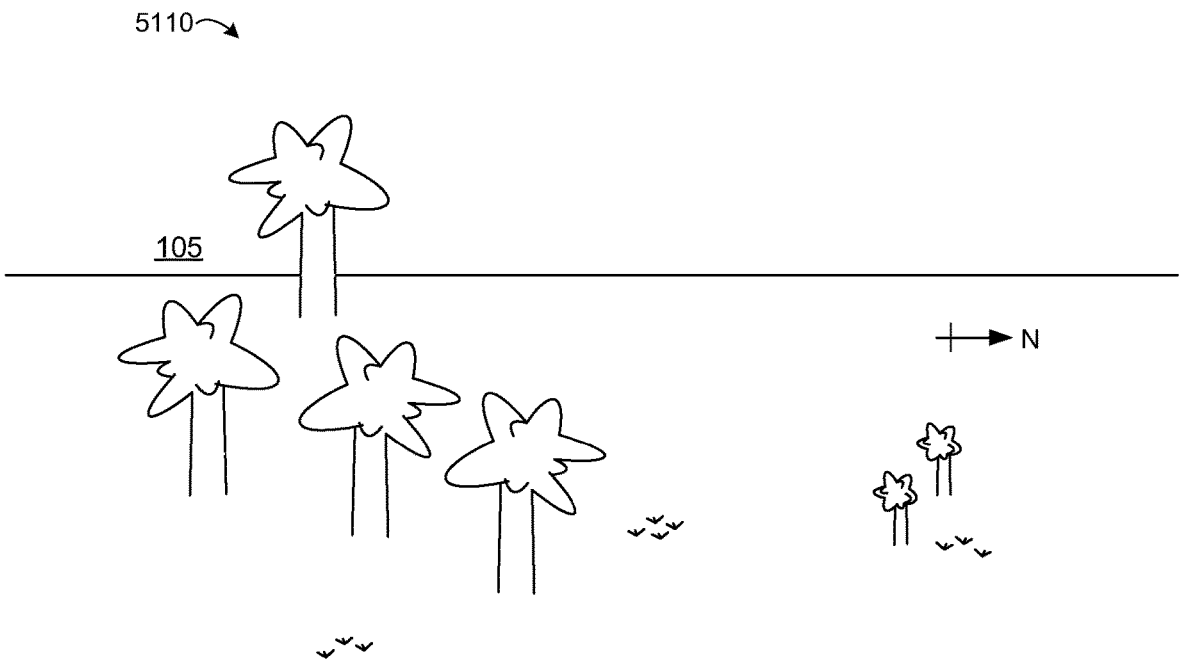
Figure 5K:
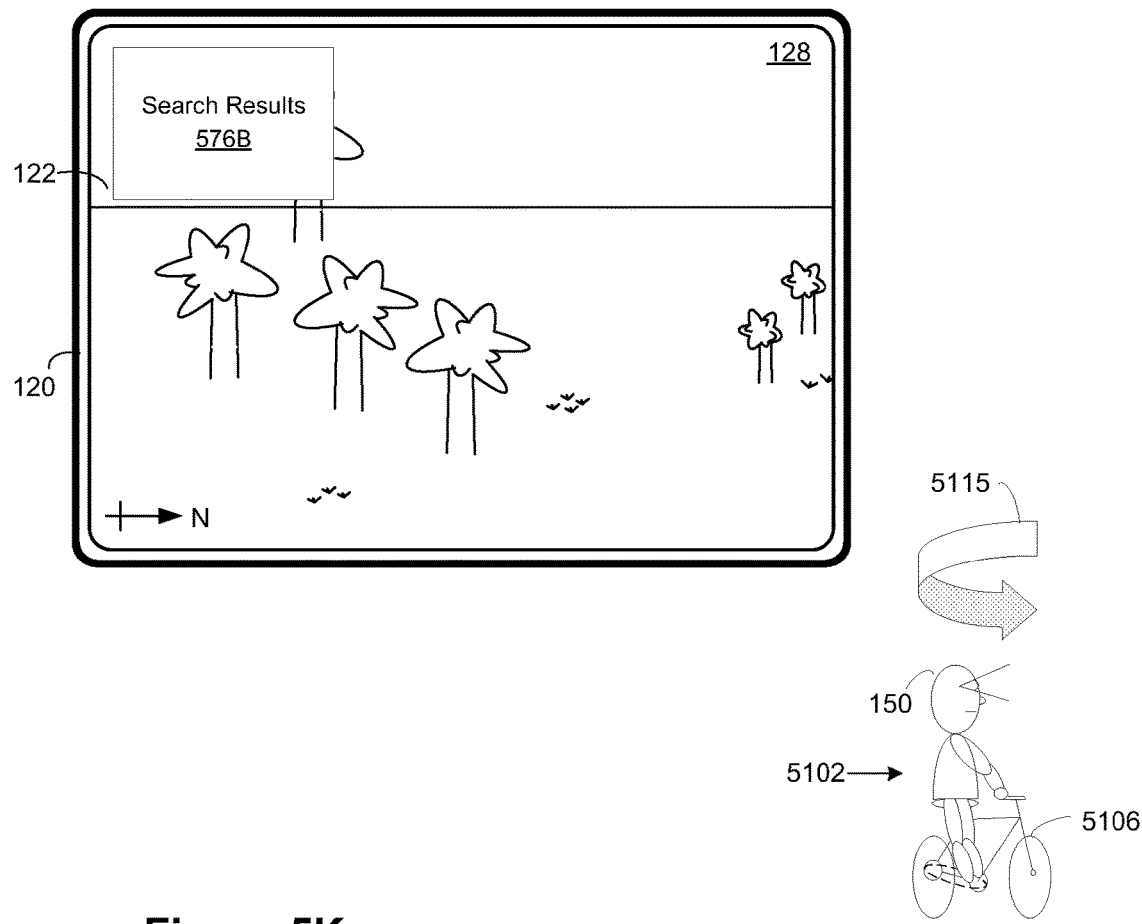
Figure 5L:
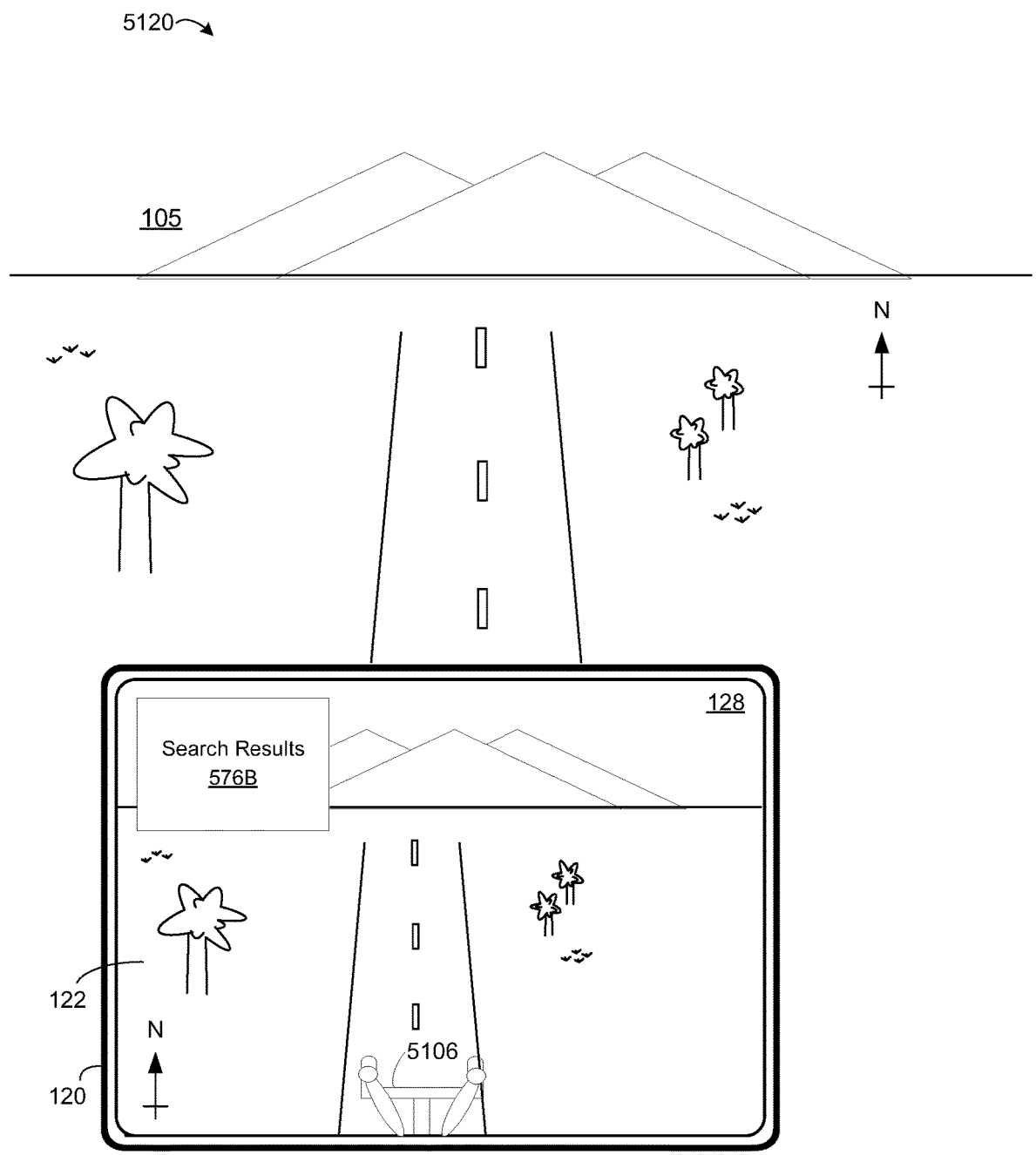
Figure 5L:
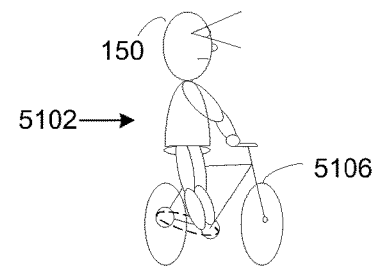

In FIG. 5J, the FOV of the exterior-facing image sensors of the electronic device 120 is currently headed in the northward facing direction. For example, the directional arrow is optionally displayed within the XR environment 128. According to some implementations, FIGS. 5J-5L illustrate a current body pose 5102 of the user 150. In FIGS. 5J-5L, the current body pose 5102 corresponds to a sitting pose while operating a bicycle 5106. As shown in FIG. 5J, during the instance 5100 (e.g., associated with time $T_{10}$) of the content delivery scenario, the electronic device 120 detects a change in the camera pose of the electronic device 120 (or the head pose of the user 150) that corresponds to a 900 counterclockwise rotational movement 5105.

As shown in FIG. 5K, during the instance 5110 (e.g., associated with time $T_{11}$) of the content delivery scenario, the electronic device 120 presents the XR environment 128 including video pass-through of the physical environment 105, including trees, from a westward facing direction (e.g., a view of the physical environment 105 when glancing to the user 150's left) in response to detecting the 90° counterclockwise rotational movement 5105 in FIG. 5J. In FIG. 5K, the XR environment 128 includes the search results 576B associated with the second appearance and the second presentation mode (e.g., the head/display-locked presentation mode) in the same location on the display 122 as in FIG. 5J. As shown in FIG. 5J, during the instance 5110 (e.g., associated with time $T_{11}$) of the content delivery scenario, the electronic device 120 detects a change in the camera pose of the electronic device 120 (or the head pose of the user 150) that corresponds to a 90° clockwise rotational movement 5115.

As shown in FIG. 5L, during the instance 5120 (e.g., associated with time $T_{12}$) of the content delivery scenario, the electronic device 120 presents the XR environment 128 including video pass-through of the physical environment 105 from the northward facing direction in response to detecting the 90° clockwise rotational movement 5115 in FIG. 5K. In FIG. 5L, the XR environment 128 includes the search results 576B associated with the second appearance and the second presentation mode (e.g., the head/display-locked presentation mode) in the same location as in FIGS. 5J and 5K. In this example, the search results 576B is associated with the head/display-locked presentation mode so as not to the obstruct the user 150's view while operating the bicycle 5106. In some implementations, the set of input modes for interacting with the XR environment 128 during the instances 5110 and 5120 may be the same as those available during the instance 590. While not shown, the display 122 may optionally present the text box 547 during the instances 5110 and 5120 to indicate the available set of input modes.

Figure 6:
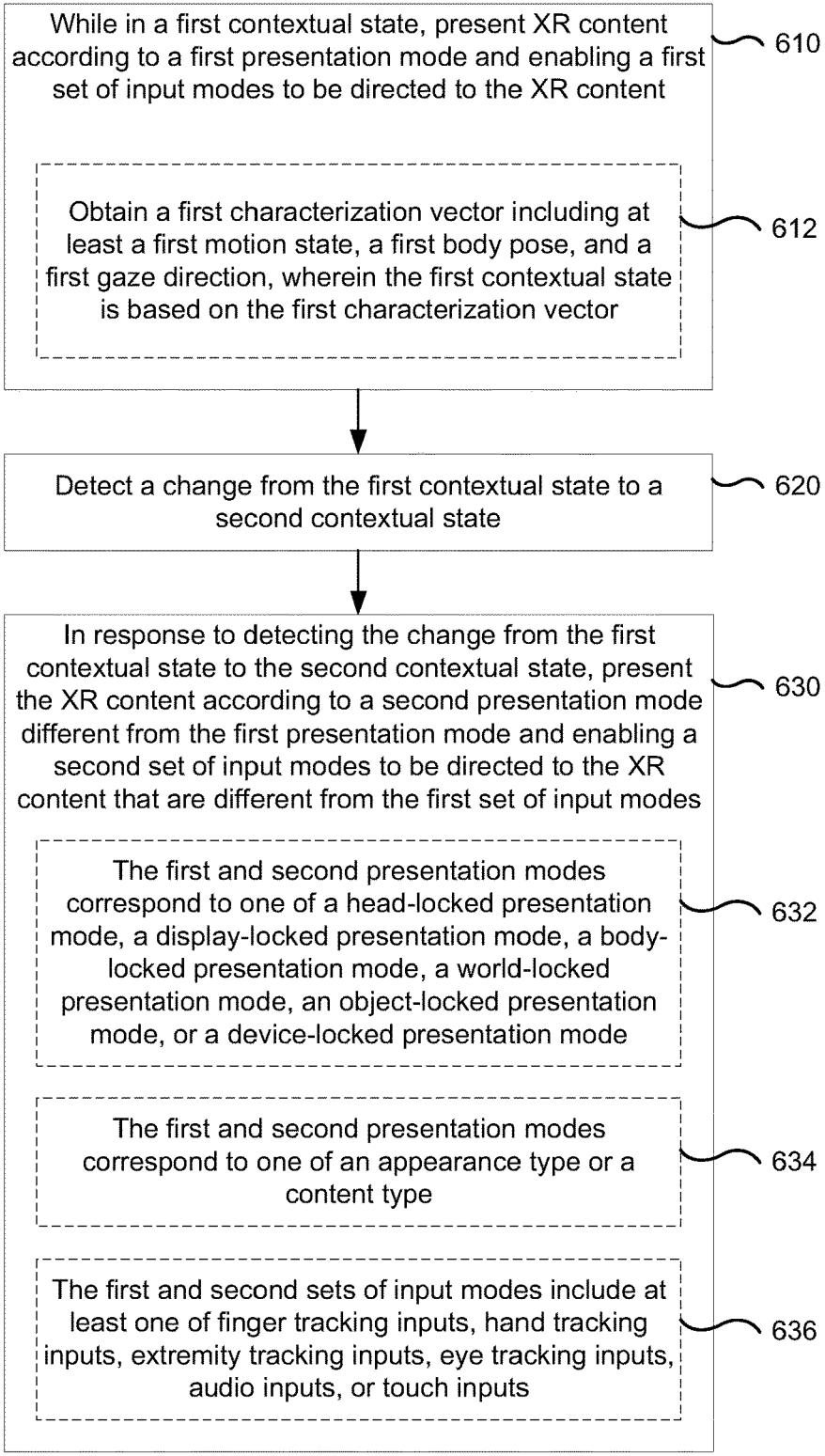
FIG. 6 is a flowchart representation of a method of dynamically changing sensory and/or input modes associated with content based on a current contextual state in accordance with some implementations.

FIG. 6 is a flowchart representation of a method 600 of dynamically changing sensory and/or input modes associated with content based on a current contextual state in accordance with some implementations. In various implementations, the method 600 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 600 is performed by processing logic, including hardware, firmware, software, or a combination thereof. In some implementations, the method 600 is performed by a processor executing code stored in anon-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, one or more microphones, and/or the like.

As discussed above, content (e.g., XR or flat content) that is presented in a particular mode in a first context may not be appropriate for a second context. As one example, the presentation mode and input modes for a timer widget while in a sitting state may not be appropriate while riding a bicycle or driving an automobile. In order to ameliorate this issue, the technology described herein dynamically changes sensory and/or input modes with respect to the content based on a change in contextual state such as a change in location, motion state, body pose, head pose, gaze direction, and/or the like.

As represented by block 610, while in a first contextual state, the method 600 includes presenting extended reality (XR) content, via the display device, according to a first presentation mode and enabling a first set of input modes to be directed to the XR content. In FIG. 5A, for example, the electronic device 120 presents an XR environment 128 including a virtual agent (VA) 505 and video pass-through of the physical environment 105 (e.g., a kitchen in FIGS. 5A-5C) from a northward facing direction. In FIG. 5A, the XR environment 128 also includes a timer widget 504A (e.g., the XR content) associated with a first appearance and a first presentation mode and a text box 517 associated with a current set of input modes for interacting with the XR environment 128. For example, the timer widget 504A corresponds to text, an image, an icon, a badge, video content, volumetric/3D XR content, and/or the like. For example, the first appearance associated with the timer widget 504A corresponds to an oval shape, a first size, a first color, a first brightness, and/or the like (e.g., a first visualization of a countdown timer). In some implementations, the first presentation mode for the timer widget 504A corresponds to a world/object-locked presentation mode whereby the timer widget 504A is anchored to a physical object (e.g., a microwave 516) within the physical environment 105.

In some implementations, the first set of input modes includes at least some of audio commands, gaze/eye tracking inputs, hand/extremity tracking inputs, touch inputs, and/or the like. some implementations, the XR content corresponds to a widget, an XR object that is volumetric/3D, a notification, a text box, information associated with a search command, and/or the like presented within an XR environment. As one example, while a user is sitting at a table (e.g., as shown in FIGS. 5G-5I), the first contextual state corresponds to a stationary motion state and a sitting body pose. As another example, while a user is operating an automobile (e.g., as shown in FIGS. 5D-5F), the first contextual state corresponds to an in-motion motion state and a sitting body pose. As yet another example, while a user is riding a bicycle (e.g., as shown in FIGS. 5J-5L), the first contextual state corresponds to an in-motion motion state and a sitting/standing body pose.

As one example, the first presentation mode corresponds to a head or display-locked presentation mode and the first set of input modes includes eye tracking inputs and audio inputs while the first contextual state corresponds to operation of a conveyance (e.g., a bicycle, an automobile, or the like). As such, in this example, the computing system limits distractions as well as obstructions to the user's field of view to increase safety while operating the conveyance.

As another example, the first presentation mode corresponds to a world or object-locked presentation mode and the first set of input modes includes finger tracking inputs, hand tracking inputs, extremity tracking inputs, eye tracking inputs, audio inputs, or touch inputs while the first contextual state corresponds to performance of a substantially stationary activity (e.g., working at a desk, cooking dinner, consuming media content, and/or the like). As such, in this example, the computing system expands its feature-set to increase functionality while the user is performing a substantially stationary activity.

In some implementations, as represented by block 612, the method 600 includes obtaining a first characterization vector including at least a first location, a first motion state, a first body pose, and a first gaze direction, wherein the first contextual state is based on the first characterization vector. As one example, with reference to FIGS. 4A and 4B, the computing system or a portion thereof (e.g., the characterization engine 442 in FIG. 4A) obtains (e.g., receives, retrieves, or determines/generates) a characterization vector 443 based on a motion state vector 411 (e.g., including the first motion state), an eye tracking vector 413 (e.g., including the first gaze direction), and a pose characterization vector 415 (e.g., including the first body pose and the first head pose).

In some implementations, obtaining the first characterization vector corresponds to generating the first characterization vector based on sensor data collected by the computing system. In some implementations, the sensor data is collected by a combination of optional remote sensors, the electronic device 120, and the controller 110. As shown in FIG. 4A, for example, the characterization vector 443 is based on the local sensor data 403 and/or the remote sensor data 405.

In some implementations, the display device corresponds to a transparent lens assembly, and wherein presenting the XR content includes projecting the XR content onto the transparent lens assembly. In some implementations, the display device corresponds to a near-eye system, and wherein presenting the XR content includes compositing the XR content with one or more images of a physical environment captured by an exterior-facing image sensor.

As represented by block 620, the method 600 includes detecting a change from the first contextual state to a second contextual state. As one example, the computing system detects a change from a first contextual state in FIGS. 5A-5C (e.g., a household location, a standing body pose, and a mixed motion state) and to a second contextual state in FIGS. 5D-5F (e.g., a vehicular location, a sitting body pose, and an in-motion motion state). For example, detecting the change in contextual state corresponds to detecting a change to at least one of a location, a motion state, a body pose, a head pose, or a gaze direction.

As represented by block 630, in response to detecting the change from the first contextual state to the second contextual state, the method 600 includes presenting, via the display device, the XR content according to a second presentation mode different from the first visual presentation and enabling a second set of input modes to be directed to the XR content that are different from the first input modes. As one example, with reference to FIGS. 4A and 4B, the computing system or a portion thereof (e.g., the sensory mode selector 446 in FIG. 4A) selects a presentation mode 447 for XR content within the XR environment 128 based on the characterization vector 443 (e.g., associated with the second contextual state). As one example, with reference to FIGS. 4A and 4B, the computing system or a portion thereof (e.g., the input mode selector 444 in FIG. 4A) selects a set of input modes 445 for interacting with the XR environment 128 based on the characterization vector 443 and an XR environment descriptor 439 associated with the XR environment 128 (e.g., a scene description for the XR environment 128 and information associated with the XR content 427 therein).

In FIG. 5D, for example, the electronic device 120 presents the XR environment 128 including video pass-through of the physical environment 105 (e.g., a view from a driver seat of an automobile 544 in FIGS. 5D-5F) from a northward facing direction. In FIG. 5D, the XR environment 128 also includes a timer widget 504B (e.g., the XR content) associated with a second appearance and a second presentation mode and a text box 547 associated with a current set of input modes for interacting with the XR environment 128. For example, the timer widget 504B corresponds to text, an image, an icon, a badge, video content, volumetric/3D XR content, and/or the like. For example, the second appearance associated with the timer widget 504B corresponds to a rectangular shape, a second size, a second color, a second brightness, and/or the like (e.g., a second visualization of a countdown timer). In some implementations, the second presentation mode for the timer widget 504B corresponds to a head/display-locked presentation mode whereby the timer widget 504B is anchored to a predefined position on the display 122.

In some implementations, in response to detecting the change from the first contextual state to the second contextual state, the method 600 includes selecting one or more different sensory modalities associated with the XR content such as an audio feedback mode (e.g., no audio feedback, audio feedback for select actions by and interactions with the XR content, audio feedback for all actions by and interactions with the XR content, or the like), a haptic feedback mode (e.g., no haptic feedback, haptic feedback for select actions by and interactions with the XR content, haptic feedback for all actions by and interactions with the XR content, or the like), and/or the like. As one example, with reference to FIGS. 4A and 4B, the computing system or a portion thereof (e.g., the sensory mode selector 446 in FIG. 4A) selects a one or more different sensory modalities associated with the XR content within the XR environment 128 based on the characterization vector 443 (e.g., associated with the second contextual state).

In some implementations, as represented by block 632, the first and second presentation modes correspond to one of a head-locked presentation mode, a display-locked presentation mode, a body-locked presentation mode, a world/object-locked presentation mode, or a device-locked presentation mode. As one example, FIGS. 5A-5C illustrate a sequence in which the timer widget 504A is world/object-locked to the microwave 516 within the physical environment 105 as rotational movement of the camera pose of the electronic device 120 (or head pose of user 150) is detected. As another example, FIGS. 5D-5F illustrate a sequence in which the timer widget 504B is head/display-locked to a predefined position (e.g., the upper left corner) on the display 122 as rotational movement of the camera pose of the electronic device 120 (or head pose of user 150) is detected. As yet another example, FIGS. 5G-5I illustrate a sequence in which the search result 576A is world/object-locked to the painting 573 within the physical environment 105 as rotational movement of the camera pose of the electronic device 120 (or head pose of user 150) is detected. As yet another example, FIGS. 5J-5L illustrate a sequence in which the search result 576B is head/display-locked to a predefined position (e.g., the upper left corner) on the display 122 as rotational movement of the camera pose of the electronic device 120 (or head pose of user 150) is detected.

In some implementations, as represented by block 634, the first and second presentation modes correspond to one of an appearance type or a content type. As one example, FIGS. 5A-5C illustrate a sequence in which the timer widget 504A is displayed with a first appearance (e.g., an oval shape). As another example, FIGS. 5D-5F illustrate a sequence in which the timer widget 504B is displayed with a second appearance (e.g., a rectangular shape). For example, the appearance type corresponds to at least one of a predefined size, color, texture, brightness, and/or the like. For example, the content type corresponds to one of text, an image, video content, volumetric/3D XR content, audio content, haptic feedback, a widget, a notification, an icon, a badge, and/or the like.

In some implementations, as represented by block 636, the first and second sets of input modes include at least one of finger tracking inputs, hand tracking inputs, extremity tracking inputs, eye tracking inputs, audio inputs, or touch inputs. As one example, FIGS. 5A-5C illustrate a sequence in which the first set of input modes includes hand/extremity tracking inputs, eye tracking inputs, audio inputs, and touch inputs. As another example, FIGS. 5D-5F illustrate a sequence in which the second set of input modes includes eye tracking inputs and audio inputs. In some implementations, the first and second sets of input modes include at least one different input mode. Therefore, in some implementations, some of the input modes may overlap between the first and second sets of input modes. In some implementations, the first and second sets of input modes include mutually exclusive input modes.

In some implementations, the first contextual state corresponds to a first body pose associated with sitting, and the second contextual state corresponds to a second body pose associated with standing. In some implementations, the first contextual state corresponds to a current stationary motion state, and the second contextual state corresponds to a current in-motion motion state. As one example, while a user is sitting at a table (e.g., as shown in FIGS. 5G-5I), the first contextual state corresponds to a stationary motion state and a sitting body pose. As another example, while a user is operating an automobile (e.g., as shown in FIGS. 5D-5F), the first contextual state corresponds to an in-motion motion state and a sitting body pose. As yet another example, while a user is riding a bicycle (e.g., as shown in FIGS. 5J-5L), the first contextual state corresponds to an in-motion motion state and a sitting/standing body pose.

In some implementations, in response to detecting the change from the first contextual state to the second contextual state, the method 600 further includes presenting (e.g., displaying visual information, providing an audio output, providing haptic feedback, etc.) an indication associated with the second contextual state. In some implementations, the computing system also presents an indication associated with the current contextual state (e.g., permanent or temporary visual, audio, haptic, etc. feedback). In some implementations, the computing system also presents an indication associated with the current contextual state when the contextual state changes. (e.g., permanent or temporary visual, audio, haptic, etc. feedback). As one example, the indication associated with the current contextual state corresponds to a visual notification with text, images, icons, etc. As another example, the indication associated with the current contextual state corresponds to an audible chime or audio output data indicating the current contextual state.

In some implementations, in response to detecting the change from the first contextual state to the second contextual state, the method 600 further includes presenting (e.g., displaying visual information, providing an audio output, providing haptic feedback, etc.) an indication associated with the second set of input modes. As one example, with reference to FIG. 5G, the electronic device 120 presents the XR environment 128 including a text box 517 associated with the current set of input modes for interacting with the XR environment 128. As shown in FIG. 5G, the text box 517 associated with the current set of input modes for interacting with the XR environment 128 indicates that the following input modes are currently enabled: extremity tracking, eye tracking, touch, and voice. As another example, with reference to FIG. 5J, the electronic device 120 presents the XR environment 128 including a text box 547 associated with a current set of input modes for interacting with the XR environment 128. As shown in FIG. 5J, the text box 547 associated with the current set of input modes for interacting with the XR environment 128 indicates that the following input modes are currently enabled: eye tracking and voice.

In some implementations, the computing system also presents an indication associated with the second set of input modes state (e.g., permanent or temporary visual, audio, haptic, etc. feedback). As one example, the indication associated with the second set of input modes corresponds to a visual notification with text, images, icons, etc. As another example, the indication associated with the second set of input modes corresponds to an audible chime or audio output data indicating the second set of input modes.

In some implementations, in response to detecting the change from the first contextual state to the second contextual state, the method 600 further includes presenting, via the display device, one or more application launcher options based on the second contextual state. As one example, while cooking, the computing system provides selectable application launcher options for a wet/dry measurements application, a timer application, a recipe application, and/or the like. As another example, while driving, the computing system provides selectable application launcher options for a navigation application and a weather application. As yet another example, while riding a bicycle, the computing system provides selectable application launcher options for a timekeeping application, a calendar application, a navigation application, and/or a weather application. In some implementations, the computing system may also provide accelerators based on the current contextual state in addition to or in place of the application launcher options.

In some implementations, after presenting the XR content according to a second presentation mode, the method 600 further includes: detecting a user input directed to the XR content; and in response to detecting the user input and in accordance with a determination that the user input corresponds to one of the second set of input modes, modifying the XR content based on the user input. For example, the user input corresponds to one of a hand/extremity tracking input, an eye tracking input, an audio/speech input, and a touch input. For example, the magnitude of the modification to the XR content is based on the magnitude/displacement of the user input. In some implementations, modifying the XR content corresponds to at least one of rotating, translating, or scaling the XR content. In some implementations, modifying the XR content corresponds to changing an appearance of the XR content. For example, changing the appearance of the XR content corresponds to at least one of changing a color of the XR content, changing a texture of the XR content, changing a shape of the XR content, or changing a brightness value of the XR content.

In some implementations, after presenting the XR content according to a second presentation mode, the method 600 further includes: detecting a user input directed to the XR content; and in response to detecting the user input and in accordance with a determination that the user input does not correspond to one of the second set of input modes, forgoing modifying the XR content based on the user input. In other words, the computing system maintains the appearance of the XR content as presented before detecting the user input.

FIG. 7 illustrates various candidate presentation mode transitions in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 7 shows a plurality of candidate presentation mode transitions for media content and/or XR content, including: a transition 702 from the world-locked presentation mode to the head-locked presentation mode, a transition 704 from the world-locked presentation mode to the body-locked presentation mode, a transition 706 from the head-locked presentation mode to the world-locked presentation mode, a transition 708 from the head-locked presentation mode to the body-locked presentation mode, a transition 712 from the body-locked presentation mode to the head-locked presentation mode, and a transition 714 from the body-locked presentation mode to the world-locked presentation mode. One of ordinary skill in the art will appreciate that the computing system may present content according to other presentation modes different from the world-locked, head-locked, and body-locked presentation modes, and, as such, the computing system may be capable of handling transitions to or from the other presentation modes.

According to some implementations, FIG. 7 also illustrates a table 710 indicating that six-degrees of freedom (6DOF) world tracking is enabled for world-locked content and disabled for head-locked and body-locked content. For example, while presenting content in the world-locked presentation mode, the computing system performs 6DOF world tracking on a physical object within the physical environment 105, a reference point within the physical environment 105, and/or the like based at least in part on CV techniques, VIO, magnetic tracking, IMU data, accelerometer data, gyroscope data, and/or the like. Optionally, in some implementations, while presenting content in the body-locked presentation mode, the computing system also performs 6DOF world tracking.

Moreover, according to some implementations, the table 710 indicates that head pose tracking is enabled for world-locked and body-locked content and disabled for head-locked content. For example, while presenting content in the world-locked or body-locked presentation modes, the computing system or a component thereof (e.g., the body/head pose tracking engine 414 in FIGS. 2 and 4A) performs head pose tracking with respect to the user 150. Optionally, in some implementations, while presenting content in the head-locked presentation mode, the computing system or a component thereof (e.g., the body/head pose tracking engine 414 in FIGS. 2 and 4A) performs head pose tracking with respect to the user 150.

Furthermore, according to some implementations, the table 710 indicates that body pose tracking is enabled for body-locked content and disabled for world-locked and head-locked content. For example, while presenting content in the body-locked presentation mode, the computing system or a component thereof (e.g., the body/head pose tracking engine 414 in FIGS. 2 and 4A) performs body pose tracking with respect to the user 150. Optionally, in some implementations, while presenting content in the world-locked presentation mode or the head-locked presentation mode, the computing system or a component thereof (e.g., the body/head pose tracking engine 414 in FIGS. 2 and 4A) performs body pose tracking with respect to the user 150.

According to some implementations, the computing system updates the position, orientation, scale, and/or the like of the world-locked, head-locked, and/or body-locked content based on head pose and/or body pose changes of the user. According to some implementations, the computing system updates the position, orientation, scale, and/or the like of the world-locked content based on translational and/or rotational changes to one or more physical objects within the physical environment that are subject to 6DOF world tracking.

In some implementations, the computing system updates body-locked content to maintain a distance and an orientation offset relative to a portion of the user's body (e.g., torso). For example, the computing system presents the body-locked content 5 meters away from the user's torso and 45 degrees to the left of the user's torso (e.g., initial front-facing direction relative to the user's face). In this example, if the user's head rotates while the torso remains static, a body-locked virtual object would appear to remain stationary in the 3D environment at 5 meters away and 45 degrees to the left of the user's torso, which may or may not still be in their field of view. However, continuing with this example, if the user's torso rotates (e.g., by spinning around in a chair), the body-locked virtual object would follow the torso rotation and be repositioned within the 3D environment such that the virtual object is still 5 meters m away and 45 degrees to the left of the user's torso (e.g., subsequent front-facing direction relative to the user's face).

According to other implementations, the computing system updates body-locked content to maintain a distance offset relative to a portion of the user's body (e.g., torso) but not an orientation offset. For example, the computing system presents the body-locked content 5 meters away from the user's torso (e.g., initial front-facing direction relative to the user's face). In this example, if the user's torso rotates (e.g., by spinning around in a chair), the body-locked virtual object would not follow the torso rotation and would remain 5 meters away relative to the initial front-facing direction of the user, which is now directly behind the user.

Figure 8:
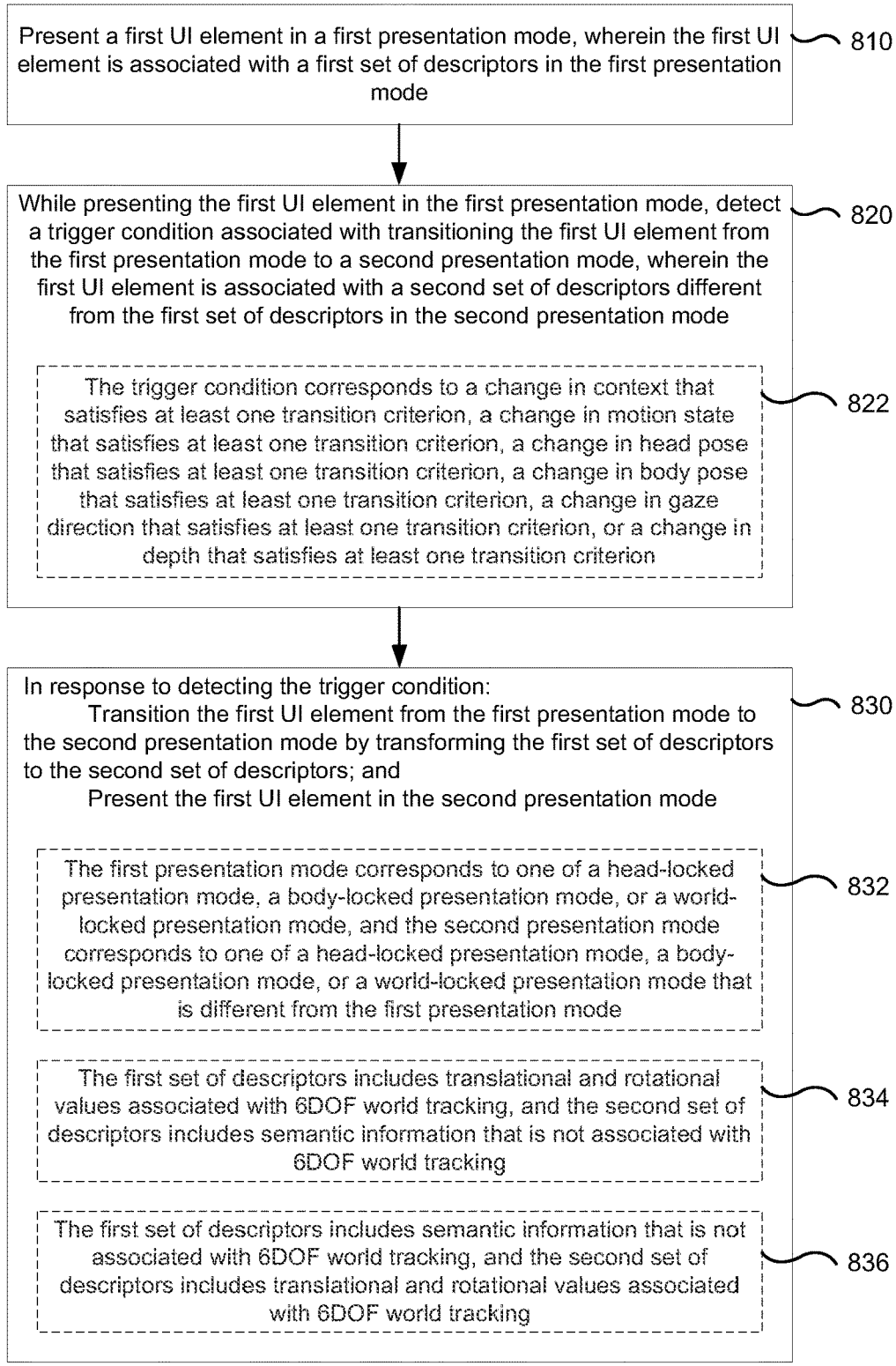
FIG. 8 is a flowchart representation of a method of improved presentation mode transitions in accordance with some implementations.

FIG. 8 is a flowchart representation of a method of improved presentation mode transitions in accordance with some implementations. In various implementations, the method 800 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, one or more microphones, and/or the like.

Typically, transitioning UI elements or XR content between presentation modes may be possible if a same type of tracking or coordinate system is used in both presentation modes. However, if either of the initial or subsequent presentation modes does not use the same type of tracking or coordinate system, the transition between presentation modes may not be possible or may be jerky/discontinuous. As such, according to some implementations, the method described herein provides a seamless transition from the first presentation mode to the second presentation mode by transforming the first set of descriptors for the first UI element to the second set of descriptors that are different from the first set of descriptors. As such, the invention described herein enables a UI element (or XR content) to transition between a first presentation mode and a second presentation mode by transforming a first set of descriptors (e.g., that correspond to a first tracking/coordinate system) for the UI element to a second set of descriptors (e.g., that correspond to a second tracking/coordinate system) different from the first set of descriptors (e.g., transition from 6DOF world tracking to higher-level semantic tracking, or transition from higher-level semantic tracking to 6DOF world tracking).

As represented by block 810, the method 800 includes presenting, via the display device, a first user interface (UI) element in a first presentation mode, wherein the first UI element is associated with a first set of descriptors in the first presentation mode. In some implementations, the first UI element corresponds to 2D media content or 3D/volumetric XR content. For example, the first UI element corresponds to extended reality (XR) content within an XR environment. In some implementations, the first UI element corresponds to an affordance, a notification, a text box, or the like. In some implementations, while in the first presentation mode, the computing system performs some combination of no tracking, 6DOF world tracking, head pose tracking, and/or body pose tracking.

As one example, in FIG. 5A, the electronic device 120 presents the XR environment 128 including a timer widget 504A (e.g., the first UI element or XR content) in a first presentation mode. For example, the timer widget 504A corresponds to text, an image, an icon, a badge, video content, 3D/volumetric XR content, and/or the like. In some implementations, the first presentation mode for the timer widget 504A corresponds to a world/object-locked presentation mode whereby the timer widget 504A is anchored to a physical object (e.g., the microwave 516) within the physical environment 105 that is subject to 6DOF world tracking.

In some implementations, the display device corresponds to a transparent lens assembly, and wherein presenting the first UI element content includes projecting the first UI element onto the transparent lens assembly. In some implementations, the display device corresponds to a near-eye system, and wherein presenting the first UI element includes compositing the first UI element with one or more images of a physical environment captured by an exterior-facing image sensor.

As represented by block 820, while presenting the first UI element in the first presentation mode, the method 800 includes detecting a trigger condition associated with transitioning the first UI element from the first presentation mode to a second presentation mode, wherein the first UI element is associated with a second set of descriptors different from the first set of descriptors in the second presentation mode. As one example, while the first UI element is presented in the head-locked presentation mode (e.g., the first presentation mode), the computing system may not perform any tracking and present the first UI element at particular (e.g., static) x, y pixel coordinates relative to the display device or particular (e.g., static) x, y, z coordinates relative to the field-of-view of the user. Continuing with this example, the computing system may optionally update the position, orientation, scale, appearance, and/or the like of the first UI element based on head pose changes of the user. As another example, while the first UI element is presented in the body-locked presentation mode (e.g., the first presentation mode), the computing system may perform head and/or body pose tracking. Continuing with this example, the computing system may update the position, orientation, scale, appearance, and/or the like of the first UI element based on head and/or body pose changes of the user.

As one example, with reference to FIGS. 4A and 4B, the computing system or a portion thereof (e.g., the characterization engine 442 in FIG. 4A) obtains (e.g., receives, retrieves, or determines/generates) a characterization vector 443 based on a motion state vector 411 (e.g., including the first motion state), an eye tracking vector 413 (e.g., including the first gaze direction), and a pose characterization vector 415 (e.g., including the first body pose and the first head pose) and updates the characterization vector 443 over time. According to some implementations, the computing system detects the trigger condition when a change to the characterization vector 443 or the like satisfies at least one transition criterion described below with reference to block 822.

In some implementations, as represented by block 822, the trigger condition corresponds to one of: a change in context that satisfies at least one transition criterion, a change in motion state that satisfies at least one transition criterion, a change in head pose that satisfies at least one transition criterion, a change in body pose that satisfies at least one transition criterion, a change in gaze direction that satisfies at least one transition criterion, a change in depth that satisfies at least one transition criterion, or the like.

As one example, the change in the context satisfies a transition criterion when the computing system detects, for example, a change from a productivity state (e.g., content creation) to an entertainment or media consumption state, a change from a first application (e.g., a word processor application, a spreadsheet editing application, a calendar application, an illustration or image editing application, a video editing application, or the like) to a second application (e.g., a web browser application, a social media application, a messaging application, a gaming application, a content viewing application, or the like), a change in ambient lighting such as moving from a bright room to a dark room, a change in ambient audio such as moving from a quiet space to a busy airport terminal or restaurant, or the like. As another example, the change in motion state satisfies a transition criterion when the computing system detects, for example, a change from a sitting or prone state to an in-motion state such as walking, running, bicycling, or the like.

As yet another example, the change in head pose satisfies a transition criterion when the computing system detects, for example, an angular displacement value (or a change thereto), an angular velocity value (or a change thereto), an angular acceleration value (or a change thereto), or an angular jerk value (or a change thereto) of the head pose that satisfies (e.g., exceeds) a deterministic (predefined) or non-deterministic threshold value. As yet another example, the change in body pose satisfies a transition criterion when the computing system detects, for example, an angular displacement value (or a change thereto), an angular velocity value (or a change thereto), an angular acceleration value (or a change thereto), or an angular jerk value (or a change thereto) of some portion of the body pose that satisfies (e.g., exceeds) a deterministic (predefined) or non-deterministic threshold value. As yet another example, the change in gaze direction satisfies a transition criterion when the computing system detects, for example, an angular displacement value (or a change thereto), an angular velocity value (or a change thereto), an angular acceleration value (or a change thereto), or an angular jerk value (or a change thereto) of the gaze direction that satisfies (e.g., exceeds) a deterministic (predefined) or non-deterministic threshold value. As yet another example, a change in depth satisfies a transition criterion when the computing system detects, for example, a mean, median, average, or maximum depth relative to the physical environment that falls below a threshold depth value such as when the user 150 comes within X cm of a wall within the physical environment 105.

As represented by block 830, in response to detecting the trigger condition, the method 800 includes: transitioning the first UI element from the first presentation mode to the second presentation mode by transforming the first set of descriptors to the second set of descriptors; and presenting, via the display device, the first UI element in the second presentation mode. According to some implementations, the first set of descriptors may be associated with a first coordinate system (e.g., world coordinates), and the second set of descriptors may be associated with a second coordinate system different from the first coordinate system (e.g., spherical or cylindrical coordinates relative to the user or the field-of-view of the user). In some implementations, the first set of descriptors may be associated with or derived from a physical object or a point within the physical environment, and the second set of descriptors may be associated with or derived from the body and/or head pose of the user.

According to some implementations, the computing system maintains the position, orientation, scale, appearance, and/or the like of the first UI element before and after the transition from the first presentation mode to the second presentation mode. According to some implementations, the computing system maintains the position, orientation, scale, appearance, and/or the like of the first UI element before, during, and after the transition from the first presentation mode to the second presentation mode.

As one example, with reference to FIGS. 4A and 7, the computing system or a component thereof (e.g., the mode manager 440) transitions the first UI element from the first presentation mode to the second presentation mode in response to detecting the trigger condition (e.g., a change to the characterization vector 443 that satisfies at least one transition criterion described above with respect to the block 822). In some implementations, while in the second presentation mode, the computing system performs some combination of no tracking, 6DOF world tracking, head pose tracking, and/or body pose tracking that is different from the combination in the first presentation mode.

In some implementations, the computing system transforms the first set of descriptors to the second set of descriptors based on heuristics that may increase the comfort of the transition between presentation modes, adhere to the new presentation mode, and/or align with appropriate metaphors of the transition between presentation modes. For example, the first set of descriptors correspond to attributes or values associated with translation and rotation in 6DOF relative to a physical object within a physical environment (e.g., for world-locked content), and the second set of descriptors correspond to attributes or information associated with semantic information such as angular offsets relative to the user or the like (e.g., for body-locked content). As one example, the computing system transforms X, Y, and Z coordinates for world-locked content to cylindrical or spherical coordinates relative to the body and/or head of the user for body-locked or head-locked content. As another example, the computing system transforms the rotational values for the world-locked content to rotational values for the body-locked or head-locked content. As such, according to some implementations, the computing system provides a consistent user experience so that virtual object appears in the same position and/or orientation before and after switching presentation modes.

In some implementations, as represented by block 832, the first presentation mode corresponds to one of a head-locked presentation mode, a body-locked presentation mode, or a world-locked presentation mode, and second presentation mode corresponds to one of a head-locked presentation mode, a body-locked presentation mode, or a world-locked presentation mode that is different from the first presentation mode. As one example, in FIG. 5A, the electronic device 120 presents the XR environment 128 including a timer widget 504A (e.g., the first UI element or XR content) in the first presentation mode (e.g., the world/object-locked presentation mode).

In some implementations, as represented by block 834, the first set of descriptors includes translational and rotational values associated with six-degrees of freedom (6DOF) world tracking, and the second set of descriptors includes semantic information that is not associated with 6DOF world tracking. As one example, the first set of descriptors includes translational and rotational values relative to a physical object within the physical environment 105. As another example, the first set of descriptors includes translational and rotational values relative to a reference point or origin within the XR environment 128. As yet another example, the first set of descriptors includes translational and rotational values relative to a reference point or origin within the physical environment 105. For example, the second set of descriptors corresponds to higher level semantic information such as x and y angular offsets relative to the user or a portion of the user (e.g., the user's torso) and a z-depth for the second presentation mode (e.g., the head-locked presentation mode or the body-locked presentation mode) versus 6DOF world tracking information for first presentation mode (e.g., the world-locked presentation mode).

As one example, with reference to the transition 702 in FIG. 7, while in the first presentation mode (e.g., the world-locked presentation mode), the first UI element is defined by a first set of descriptors that includes translational and/or rotational values for 6DOF world tracking. With continued reference to the transition 702, while in the second presentation mode (e.g., the head-locked presentation mode), the first UI element is defined by a second set of descriptors that includes semantic information such as pixel coordinates relative to the display device or the like.

As another example, with reference to the transition 704 in FIG. 7, while in the first presentation mode (e.g., the world-locked presentation mode), the first UI element is defined by a first set of descriptors that includes translational and/or rotational values for 6DOF world tracking. With continued reference to the transition 704, while in the second presentation mode (e.g., the body-locked presentation mode), the first UI element is defined by a second set of descriptors that includes semantic information such as translational and/or rotational values relative to the current body and/or head pose of the user.

In some implementations, as represented by block 836, the first set of descriptors includes semantic information that is not associated with 6DOF world tracking, and the second set of descriptors includes translational and rotational values associated with six-degrees of freedom (6DOF) world tracking. As one example, with reference to the transition 706 in FIG. 7, while in the first presentation mode (e.g., the head-locked presentation mode), the first UI element is defined by a first set of descriptors that includes semantic information such as pixel coordinates relative to the display device or the like. With continued reference to the transition 706, while in the second presentation mode (e.g., the world-locked presentation mode), the first UI element is defined by a second set of descriptors that includes translational and/or rotational values for 6DOF world tracking.

As another example, with reference to the transition 714 in FIG. 7, while in the first presentation mode (e.g., the body-locked presentation mode), the first UI element is defined by a first set of descriptors that includes semantic information such as translational and/or rotational values relative to the current body and/or head pose of the user. With continued reference to the transition 714, while in the second presentation mode (e.g., the world-locked presentation mode), the first UI element is defined by a second set of descriptors that includes translational and/or rotational values for 6DOF world tracking.

In some implementations, the first UI element is dynamic (e.g., updated) relative to head and/or body pose changes of the user in the first presentation mode, and the first UI element is static (e.g., not updated) relative to head and/or body pose changes of the user in the second presentation mode. In some implementations, the first UI element is static relative to head and/or body pose changes of the user in the first presentation mode, and the first UI element is dynamic relative to head and/or body pose changes of the user in the second presentation mode.

In some implementations, the first UI element is dynamic (e.g., updated) relative to translational and/or rotational pose changes of a physical object within the physical environment that is subject to 6DOF world tracking in the first presentation mode, and the first UI element is static (e.g., not updated) relative to translational and/or rotational pose changes of the physical object within the physical environment that is subject to 6DOF world tracking in the second presentation mode. In some implementations, the first UI element is static relative to translational and/or rotational pose changes of a physical object within the physical environment that is subject to 6DOF world tracking in the first presentation mode, and the first UI element is dynamic relative to translational and/or rotational pose changes of the physical object within the physical environment that is subject to 6DOF world tracking in the second presentation mode.

According to some implementations, the computing system updates the position, orientation, scale, appearance, and/or the like of the world-locked, head-locked, and/or body-locked content (e.g., the first UI element) based on head pose and/or body pose changes of the user. According to some implementations, the computing system updates the position, orientation, scale, appearance, and/or the like of the world-locked content (e.g., the first UI element) based on translational and/or rotational changes to one or more physical objects within the physical environment that are subject to 6DOF world tracking.

In some implementations, the method 800 further includes presenting, via the display device, an animation associated with transitioning the first UI element from the first presentation mode to the second presentation mode. In some implementations, the method 800 further includes providing, via one or more output devices, feedback associated with transitioning the first UI element from the first presentation mode to the second presentation mode. In some implementations, the one or more output devices correspond to one or more displays, speakers, haptic engines, or the like. As one example, the feedback corresponds to visual feedback such as a spotlight presented on the first UI element, a frame surrounding the first UI element, a notification or text box presented adjacent to or overlaid on the first UI element, a banner notification within a UI, a change of appearance of the first UI element (e.g., a change to the brightness, color, texture, contrast, etc. of the first UI element), or the like. As another example, the feedback corresponds to haptic feedback, audible feedback, or the like.

In some implementations, the method 800 further includes: presenting, via the display device, a second UI element in the first presentation mode, wherein the second UI element is associated with a third set of descriptors in the first presentation mode; while presenting the second UI element in the first presentation mode, detecting the trigger condition; and in response to detecting the trigger condition: transitioning the second UI element from the first presentation mode to the second presentation mode by transforming the third set of descriptors to a fourth set of descriptors, wherein the second UI element is associated with the fourth set of descriptors different from the third set of descriptors in the second presentation mode; and presenting, via the display device, the second UI element in the second presentation mode. In some implementations, upon detecting the trigger condition, the computing system transitions both the first and second UI elements to the second presentation mode. In some implementations, the trigger condition(s) for transitioning the second UI element from the first presentation mode to the second presentation mode is similar to the trigger condition(s) for transitioning the first UI element from the first presentation mode to the second presentation mode described above with respect to the block 822. In some implementations, the trigger condition(s) for transitioning the second UI element from the first presentation mode to the second presentation mode is different from the trigger condition(s) for transitioning the first UI element from the first presentation mode to the second presentation mode described above with respect to the block 822.

In some implementations, the method 800 further includes: presenting, via the display device, a second UI element in the first presentation mode, wherein the second UI element is associated with a third set of descriptors in the first presentation mode; while presenting the second UI element in the first presentation mode, detecting the trigger condition; and in response to detecting the trigger condition, maintaining presentation of the second UI element in the first presentation mode. In some implementations, upon detecting the trigger condition, the computing system transitions the first UI element to the second presentation mode and maintains the second UI element in the first presentation mode.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a computing system including non-transitory memory and one or more processors, wherein the computing system is communicatively coupled to a display device and one or more input devices:
        obtaining a first characterization vector including at least a first location, a first motion state, a first body pose, and a first gaze direction;
        while in a first contextual state, presenting extended reality (XR) content, via the display device, according to a first presentation mode and enabling a first set of input modes to be directed to the XR content, wherein the first contextual state is based on the first characterization vector;
        detecting a change from the first contextual state to a second contextual state; and in response to detecting the change from the first contextual state to the second contextual state, presenting, via the display device, the XR content according to a second presentation mode different from the first presentation mode and enabling a second set of input modes to be directed to the XR content that is different from the first set of input modes.

2. The method of claim 1, wherein obtaining the first characterization vector corresponds to generating the first characterization vector based on sensor data collected by the computing system.

3. The method of claim 1, wherein the first and second presentation modes correspond to one of a head-locked presentation mode, a display-locked presentation mode, a body-locked presentation mode, an object-locked presentation mode, a world-locked presentation mode, or a device-locked presentation mode.

4. The method of claim 1, wherein the first and second presentation modes correspond to one of an appearance type or a content type.

5. The method of claim 1, wherein the first and second sets of input modes include at least one of finger tracking inputs, hand tracking inputs, extremity tracking inputs, eye tracking inputs, audio inputs, or touch inputs.

6. The method of claim 1, wherein the first presentation mode corresponds to a head or display-locked presentation mode and the first set of input modes includes eye tracking inputs and audio inputs while the first contextual state corresponds to operation or a conveyance.

7. The method of claim 1, further comprising:
in response to detecting the change from the first contextual state to the second contextual state, presenting, via the display device, an indication associated with the second contextual state.

8. The method of claim 1, further comprising:
in response to detecting the change from the first contextual state to the second contextual state, presenting, via the display device, an indication associated with the second set of input modes.

9. The method of claim 1, further comprising:
in response to detecting the change from the first contextual state to the second contextual state, presenting, via the display device, one or more application launcher options based on the second contextual state.

10. The method of claim 1, further comprising:
after presenting the XR content according to the second presentation mode, detecting a user input directed to the XR content; and
in response to detecting the user input and in accordance with a determination that the user input corresponds to one of the second set of input modes, modifying the XR content based on the user input.

11. The method of claim 10, wherein modifying the XR content corresponds to at least one of rotating, translating, or scaling the XR content.

12. A device comprising:
one or more processors;
a non-transitory memory;
an interface for communicating with a display device and one or more input devices; and
one or more programs stored in the non-transitory memory, which, when executed by the one or more processors, cause the device to:
obtain a first characterization vector including at least a first location, a first motion state, a first body pose, and a first gaze direction;
while in a first contextual state, present extended reality (XR) content, via the display device, according to a first presentation mode and enable a first set of input modes to be directed to the XR content, wherein the first contextual state is based on the first characterization vector;
detect a change from the first contextual state to a second contextual state; and
in response to detecting the change from the first contextual state to the second contextual state, present, via the display device, the XR content according to a second presentation mode different from the first presentation mode and enable a second set of input modes to be directed to the XR content that is different from the first set of input modes.

13. The device of claim 12, wherein the first contextual state corresponds to a first body pose associated with sitting, and the second contextual state corresponds to a second body pose associated with standing.

14. The device of claim 12, wherein the first and second sets of input modes include at least one different input mode.

15. The device of claim 12, wherein the first presentation mode corresponds to a world or object-locked presentation mode and the first set of input modes includes finger tracking inputs, hand tracking inputs, extremity tracking inputs, eye tracking inputs, audio inputs, or touch inputs while the first contextual state corresponds to performance of a substantially stationary activity.

16. The device of claim 12, wherein the first contextual state corresponds to a current stationary motion state, and the second contextual state corresponds to a current in-motion motion state.

17. The device of claim 12, wherein the one or more programs, which, when executed by the one or more processors, further cause the device to:
after presenting the XR content according to the second presentation mode, detect a user input directed to the XR content; and
in response to detecting the user input and in accordance with a determination that the user input corresponds to one of the second set of input modes, modify the XR content based on the user input.

18. The device of claim 17, wherein modifying the XR content corresponds to at least one of rotating, translating, or scaling the XR content.

19. A non-transitory memory storing one or more programs, which, when executed by one or more processors of a device with an interface for communicating with a display device and one or more input devices, cause the device to:
obtaining a first characterization vector including at least a first location, a first motion state, a first body pose, and a first gaze direction;
while in a first contextual state, present extended reality (XR) content, via the display device, according to a first presentation mode and enable a first set of input modes to be directed to the XR content, wherein the first contextual state is based on the first characterization vector;
detect a change from the first contextual state to a second contextual state; and
in response to detecting the change from the first contextual state to the second contextual state, present, via the display device, the XR content according to a second presentation mode different from the first presentation mode and enable a second set of input modes to be directed to the XR content that is different from the first set of input modes.

20. The non-transitory memory of claim 19, wherein the first contextual state corresponds to a current stationary motion state, and the second contextual state corresponds to a current in-motion motion state.

21. The non-transitory memory of claim 19, wherein the first and second sets of input modes include mutually exclusive input modes.

22. The non-transitory memory of claim 19, wherein modifying the XR content corresponds to changing an appearance of the XR content.

23. The non-transitory memory of claim 19, wherein the first presentation mode corresponds to a head or display-locked presentation mode and the first set of input modes includes eye tracking inputs and audio inputs while the first contextual state corresponds to operation or a conveyance.

24. The non-transitory memory of claim 19, wherein the one or more programs, which, when executed by the one or more processors of the device, further cause the device to:
after presenting the XR content according to the second presentation mode, detect a user input directed to the XR content; and
in response to detecting the user input and in accordance with a determination that the user input corresponds to one of the second set of input modes, modify the XR content based on the user input.

25. The non-transitory memory of claim 24, wherein modifying the XR content corresponds to at least one of rotating, translating, or scaling the XR content.

* * * * *